(12) United States Patent
Victor

(10) Patent No.: US 8,914,356 B2
(45) Date of Patent: Dec. 16, 2014

(54) OPTIMIZED QUERIES FOR FILE PATH INDEXING IN A CONTENT REPOSITORY

(71) Applicant: International Business Machines Corporation, Armonk, NY (US)

(72) Inventor: David B. Victor, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/666,798

(22) Filed: Nov. 1, 2012

(65) Prior Publication Data

US 2014/0122499 A1 May 1, 2014

(51) Int. Cl.
*G06F 17/30* (2006.01)

(52) U.S. Cl.
CPC .... *G06F 17/30011* (2013.01); *G06F 17/30023* (2013.01)
USPC ........... 707/722; 707/711; 707/715; 707/673; 707/741; 707/742; 707/743; 707/744; 707/745; 707/746

(58) Field of Classification Search
CPC .................... G06F 17/30011; G06F 17/30023
USPC .................. 707/711, 722, 741–746, 715, 673
See application file for complete search history.

(56) References Cited

U.S. PATENT DOCUMENTS

| | | | |
|---|---|---|---|
| 6,330,567 B1 * | 12/2001 | Chao | 707/758 |
| 6,427,123 B1 | 7/2002 | Sedlar | |
| 7,383,276 B2 | 6/2008 | Lomet | |
| 7,584,460 B2 * | 9/2009 | Broberg et al. | 717/143 |
| 7,660,808 B2 | 2/2010 | Brechner et al. | |
| 7,769,744 B2 | 8/2010 | Waas et al. | |
| 7,831,591 B2 | 11/2010 | Masuda | |
| 7,873,262 B2 * | 1/2011 | Shibata et al. | 386/241 |
| 8,015,165 B2 | 9/2011 | Idicula et al. | |
| 8,037,054 B2 | 10/2011 | Brawer et al. | |
| 8,126,944 B2 | 2/2012 | McArdle | |
| 2004/0024778 A1 | 2/2004 | Cheo | |
| 2005/0022155 A1 | 1/2005 | Broberg, III et al. | |

(Continued)

FOREIGN PATENT DOCUMENTS

| | | |
|---|---|---|
| EP | 1826692 A2 | 8/2007 |
| WO | 2008063275 A2 | 5/2008 |

OTHER PUBLICATIONS

Cabanac et al, "An Original Usage-based Metrics for Building a Unified View of Corporate Documents," DEXA'07: Proceedings of the 18th International Conference on Database and Expert Systems Applications, vol. 4653 of LNCS, pp. 202-212, 2007.

(Continued)

*Primary Examiner* — Frantz Coby
(74) *Attorney, Agent, or Firm* — Shumaker & Sieffert, P.A.

(57) ABSTRACT

Techniques for indexing file paths of items in a content repository may include taking turns in querying each different item type or folder type in a round robin schedule to visit select nodes of the folder tree of that type to update and maintain the file path indexes. Item types or folder types may be associated with a count of instances or children of instances that are missing indexes. For each item type or folder type, a query may be performed for instances of the item type or folder type having children that are missing indexes, the instances or children of the instances returned may be associated with file path indexes, and the count of instances or children of instances may be adjusted based on the associating.

25 Claims, 20 Drawing Sheets

(56) References Cited

U.S. PATENT DOCUMENTS

| | | | |
|---|---|---|---|
| 2005/0050107 A1 | 3/2005 | Mane et al. | |
| 2005/0165760 A1 | 7/2005 | Seo | |
| 2005/0228791 A1 | 10/2005 | Thusoo et al. | |
| 2005/0246310 A1* | 11/2005 | Chang et al. | 707/1 |
| 2006/0064412 A1 | 3/2006 | Cunningham et al. | |
| 2006/0161591 A1 | 7/2006 | Huang et al. | |
| 2006/0212457 A1 | 9/2006 | Pearce et al. | |
| 2007/0168327 A1 | 7/2007 | Lindblad et al. | |
| 2007/0168363 A1 | 7/2007 | Inaba et al. | |
| 2007/0203875 A1 | 8/2007 | Cave et al. | |
| 2007/0276807 A1 | 11/2007 | Chen et al. | |
| 2008/0046457 A1 | 2/2008 | Haub et al. | |
| 2008/0071805 A1 | 3/2008 | Mourra et al. | |
| 2008/0114803 A1 | 5/2008 | Chinchwadkar et al. | |
| 2008/0147614 A1 | 6/2008 | Tam et al. | |
| 2008/0177701 A1 | 7/2008 | Merritt et al. | |
| 2008/0195635 A1* | 8/2008 | Chand et al. | 707/100 |
| 2008/0235252 A1 | 9/2008 | Sakai et al. | |
| 2008/0313155 A1 | 12/2008 | Atchison et al. | |
| 2009/0112911 A1 | 4/2009 | Chu | |
| 2009/0187581 A1 | 7/2009 | Delisle et al. | |
| 2010/0010967 A1 | 1/2010 | Muller | |
| 2010/0100544 A1 | 4/2010 | Takeuchi et al. | |
| 2010/0257153 A1 | 10/2010 | Day et al. | |
| 2011/0078186 A1 | 3/2011 | Li et al. | |
| 2011/0145216 A1 | 6/2011 | Subramanya | |
| 2012/0016851 A1 | 1/2012 | Hrle et al. | |
| 2012/0096036 A1 | 4/2012 | Ebaugh et al. | |
| 2012/0173511 A1 | 7/2012 | Eto et al. | |
| 2013/0138629 A1 | 5/2013 | Rehmattullah | |
| 2013/0290301 A1* | 10/2013 | Victor | 707/722 |
| 2014/0109082 A1* | 4/2014 | Kimmet et al. | 717/176 |
| 2014/0181116 A1* | 6/2014 | Wang | 707/741 |

OTHER PUBLICATIONS

Lensing et al., "hashFS: Applying Hashing to Optimize File Systems for Small File Reads," 2010 International Workshop on Storage Network Architecture and Parallel I/Os, IEEE, pp. 33-42 (May 3, 2010).

IP.com et al.; "System and Method for Just-In-Time (JIT) Indexing", IPCOM000214355D, Jan. 22, 2012 (4 pages).

U.S. Appl. No. 13/460,391, by David B. Victor, filed Apr. 30, 2012.

U.S. Appl. No. 13/708,684, by David B. Victor, filed Dec. 7, 2012.

* cited by examiner

OPTIMIZED QUERIES FOR FILE PATH INDEXING IN A CONTENT REPOSITORY

TECHNICAL FIELD

The invention relates to data storage, and more specifically relates to file paths of items in folder trees.

BACKGROUND

Documents and content stored as files in a content repository may be logically represented as a folder tree, where each file in the content repository may be associated with and accessed by a file path that specifies a unique location of the file in the content repository. In some examples, the content repository may maintain an index for the file paths of the files in the content repository (referred to as a "file path index"), so that the file path of a file in the content repository may be quickly determined instead of having to be determined on the fly when retrieving or otherwise accessing a file. As files are created, deleted, moved, and otherwise modified in the content repository, it may be necessary to update the file path index for the content repository.

SUMMARY

In one aspect, the disclosure is directed to a method for indexing file paths of items in a content repository. The method may include, for each item type having one or more instances that are not associated with file path indexes and that are filed in one or more folders in a content repository out of a plurality of item types in turn in a round robin sequence, querying, by the at least one processor, the content repository for instances of the item type that are not associated with one or more file path indexes and that are filed in a folder that is associated with a file path index, and, responsive to the querying returning, by the at least one processor, one or more instances of the item type, associating the one or more instances of the item type with the one or more file path indexes.

In another aspect, the disclosure is directed to a computing system. The computing system may include one or more processors. The computing device may also include an indexer operable on the one or more processors and configured to: for each item type having one or more instances that are not associated with file path indexes and that are filed in one or more folders in a content repository out of a plurality of item types in turn in a round robin sequence, query the content repository for instances of the item type that are not associated with one or more file path indexes and that are filed in a folder that is associated with a file path index, and responsive to the query returning one or more instances of the item type, associate the one or more instances of the item type with the one or more file path indexes.

In another aspect, the disclosure is directed to a computer readable storage medium containing instructions. The instructions, when executed on at least one programmable processor, may cause the at least one programmable processor to perform operations. The operations may include, for each item type having one or more instances that are not associated with file path indexes and that are filed in one or more folders in a content repository out of a plurality of item types in turn in a round robin sequence, querying the content repository for instances of the item type that are not associated with one or more file path indexes and that are filed in a folder that is associated with a file path index, and responsive to the querying returning one or more instances of the item type, associating the one or more instances of the item type with the one or more file path indexes.

In another aspect, the disclosure is directed to a method for indexing file paths of items in a content repository. The method may include, for each folder type having one or more instances that have one or more child items that are not associated with file path indexes in a content repository out of a plurality of folder types in turn in a round robin sequence, querying, by the at least one processor, the content repository for child items of instances of the folder type that are not associated with one or more file path indexes, and responsive to the querying returning, by the at least one processor, one or more child items of instances of the folder type, associating the one or more child items of instances of the folder type with the one or more file path indexes.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1A:
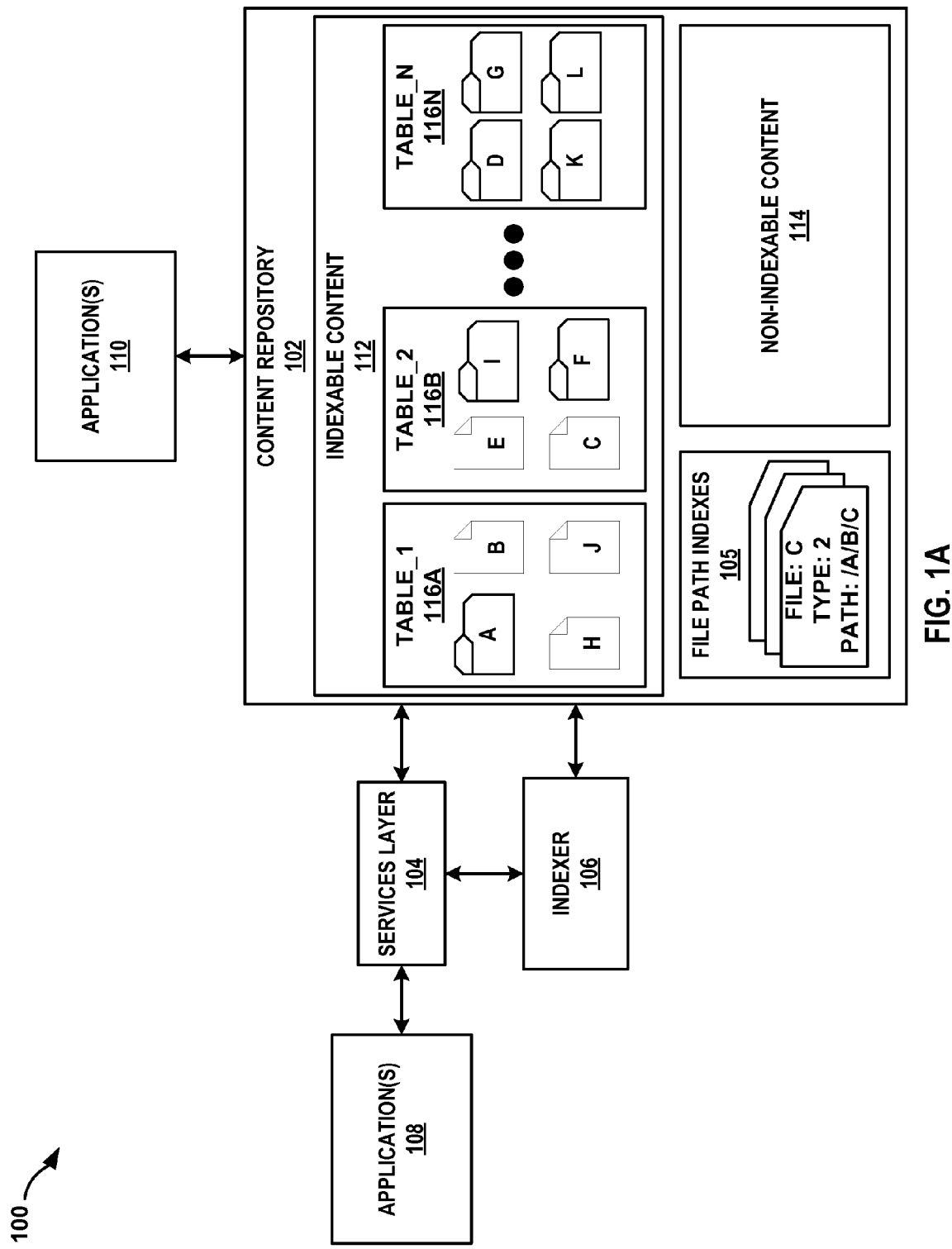
FIG. 1A is a block diagram illustrating a computing system including a content repository according to some aspects of the disclosure.

In general, techniques are described for creating and updating file path indexes for files that are represented as a folder tree in a content repository. Previous techniques such as crawling the folder tree to create and update file path indexes of files in the folder tree may be too resource intensive in an enterprise environment requiring high performance, high scaling, high stress, high load, and many users. One technique for ameliorating those deficiencies may include broadly querying across all types in a content repository to identify nodes that are missing file path indexes and to associate those nodes with file path indexes. However, querying broadly across all types in the content repository may be too resource intensive, slow, and complex to execute because such a broad query may necessitate evaluation of all possible folder and document types, including any combinations of folder and document types. In some examples, such queries may exceed the query language limits of the content repository, so that such queries are not able to be executed by the content repository. As such, there is a need for techniques for creating and updating file path indexes for files that are represented as a folder tree in a content repository that is less resource intensive, less complex, and faster to execute.

The techniques disclosed herein may take turns in querying each different item type or folder type to visit select nodes of the folder tree of that type to update and maintain the file path indexes. For example, an optimized indexer is described that may, for example, visit only nodes within the folder tree that are of the specified type and that are missing indexes, or may visit only folders that are of the specified type and that contain children missing indexes. This may significantly reduce or completely eliminate cost of visiting nodes that are already indexed or visiting nodes in the part of the content repository that should not be optimized for paths or indexed. Furthermore, by taking turns in querying each different item type or folder type, the queries may be less resource intensive. In addition, the queries may be able to find instances without file path indexes at different levels of the folder tree, as opposed to some techniques that traverse the folder tree a level at a time. In this way, the efficiency of identifying files without file path indexes and creating file path indexes for those files within the folder tree hierarchy may be improved.

In some examples, the content repository may be accessed via a services layer. The services layer may maintain the file path indexes for the files in the content repository so that a file path for a file in a folder tree may be quickly looked up. The services layer may create or update the file path indexes based on changes made to files in the content repository by applications accessing the content repository through the services layer. However, in some computing environments, certain applications may directly access the content repository without using the services layer to create, delete, move, or otherwise modify the files in the content repository, thereby causing the file path indexes maintained in the services layer to become out-of-date. As described, the techniques may be used, for example, to optimally update the file path indexes maintained by the services layer and to determine whether any files in the content repository do not have an associated file path index maintained by the services layer.

In accordance with the techniques described herein, an indexer may periodically determine whether instances of each item type or folder type in the content repository qualify for an associated file path index but do not have an associated file path index by issuing queries for items of a specified type, and may create file path indexes for those unindexed instances.

FIG. 1A is a block diagram illustrating a computing system including a content repository according to some aspects of the disclosure. In the example of FIG. 1A, computing system 100 includes content repository 102, services layer 104, indexer 106, one or more applications 108 that interact with content repository 102 via services layer 104, and one or more applications 110 that bypass services layer 104 and interact directly with content repository 102.

Computing system 100 may be made up of one or more computing devices that each includes one or more programmable processors. In some examples, computing system 100 is a part of an enterprise environment. Content repository 102, services layer 104, indexer 106, one or more applications 108, and one or more applications 110 may be operable on one or more computing devices. In some examples, a single computing device comprises content repository 102, services layer 104, indexer 106, one or more applications 108, and one or more applications 110. In some other examples, content repository 102, services layer 104, indexer 106, one or more applications 108, and one or more applications 110 are spread out over a plurality of computing devices.

Content repository 102 may be an enterprise repository that includes one or more data stores for storing documents or other digital content in computing system 100 as files on one or more computer readable storage media. In some examples, content repository 102 is organized into a hierarchy of folders and may natively support file paths or folder trees for accessing files stored within the folders. In some examples, items in content repository 102 may be associated with types, and the items in content repository 102 may be grouped or otherwise organized according to its associated type. For example, an item's associated type can denote the department that the item belongs to in an organization, or can denote the database table the item resides in.

In some examples, content repository 102 is a relational database that receives queries and returns one or more files based on the queries. If content repository 102 is a relational database, then content repository 102 may include tables 116A-116N ("tables 116"), and each of the tables 116 may include one or more items. Items in content repository 102 may be associated with a plurality of different types. For example, items may be associated with a type based on which table (out of tables 116) in the relational database includes the item, so that items A, B, H, and J may be associated with type 1 because they are included in table_1 116A, items C, E, F, and I may be associated with type 2 because they are included in table_2 116B, and items D, G, K, and L may be associated with type N because they are included in table_N.

In some environments, content repository 102 may include indexable content 112 and non-indexable content 114. Indexable content 112 may include items that may be represented hierarchically as part of one or more folder trees by services layer 104. Items in indexable content 112 may have an associated file path index in file path indexes 105 so that the items may be uniquely identified by a file path of the item in a folder tree. In some examples, file path indexes 105 is stored in content repository 102, and may be considered a part of non-indexable content 114. Conversely, non-indexable content 114 may include items that are not represented as folder trees by services layer 104. For example, non-indexable content 114 includes e-mail archives or e-mail inboxes that are not typically represented hierarchically as a folder tree.

Services layer 104 may be operably coupled to content repository 102 and may provide one or more software services and interfaces to software applications, such as one or more applications 108, for accessing items stored in content repository 102. In some examples, the services and interfaces provided by services layer 104 includes an application programming interface (API) that applications may use to access data stored in content repository 102. In some examples, services layer 104 provides web services that applications use to access data stored in content repository 102.

Services layer 104 may abstract the items in indexable content 112 of content repository 102 for one or more applications 108 so that they may appear as a part of one or more folder trees. For example, services layer 104 may maintain file path indexes 105 that includes a file path index indicating the file path for each item in a folder tree in indexable content 112. For example, as shown in FIG. 1A, file path indexes 105 may include a file path index for file "C" indicating a file path of "/A/B/C", thereby indicating that file C may be contained in folder B, which may be contained in folder A, which may be at the root folder of a folder tree. The file path index for file "C" may also indicate the type associated with type C. The services and interfaces provided by services layer 104, for example, enables one or more applications 108 to specify an item in indexable content 112 by a file path that uniquely identifies the item in the folder tree. As shown, items of one type can be contained in folders of another type. For example, while item C is associated with type 2, folders A and B are both associated with type 1.

One or more applications 110 may also directly access content repository 102 without use of services layer 104, and may directly create, delete, move, or otherwise modify files in content repository 102 without using or notifying services layer 104. Thus, file path indexes 105 maintained by services layer 104 can become out-of-date if one or more applications 110 add, delete, move, or otherwise modify items in indexable content 112. For example, one or more applications 110 may directly create a new file under a pre-existing folder in a folder tree, or may move a file from one folder to another folder in a folder tree.

Indexer 106 may be operably coupled to content repository 102 and services layer 104, and may index items in indexable content 112 in content repository 102. Indexer 106 may determine the item types in content repository 102 that are subject to file path indexing and may calculate the maximum possible number of missing file path indexes for each item type that is subject to file path indexing. For each item type in content repository that has at least one missing file path index, indexer 106 may associate that item type with the count of missing file path indexes and may store that association in a map (not shown). Indexer 106 may, item type-by-item type in a round robin schedule for each of the item types associated with the count of missing file path indexes in the map, determine instances of the item type in indexable content 112 that do not have associated file path indexes 105 and are filed in a folder that is associated with a file path index, and may create file path indexes for those instances of the item type. If content repository 102 is queryable, such as by being a relational database, indexer 106 may determine the instances of the item type in indexable content 112 that do not have associated file path indexes 105 by sending queries to content repository 102. The number of instances of the item type that were found during the query and associated with file path indexes may be subtracted from the count of missing file path indexes associated with the item type in the map to keep track of the number of instances of the item type that are still missing file path indexes.

For example, indexer 106 may identify two item types that each has one or more missing file path indexes. Indexer 106 may send a query to content repository 102 for one or more instances of a first item type of the two item types that qualify for file path indexes, such as items stored in indexable content 112, do not have file path indexes in file path indexes 105 and have a parent folder that has a file path index in file path indexes 105. Content repository 102 may receive the query from indexer 106, perform the query, and return a query result to indexer 106. The query result may indicate one or more resulting instances of the first item type that met all of the requirements of the query. In response, indexer 106 may create file path indexes for the resulting instances from the querying, may store each file path index in file path indexes 105, and may decrement the number of missing file path indexes associated with the first item type by the number of instances of the first item type returned in the query result and associated with file path indexes.

Subsequently, indexer 106 may similarly send a query to content repository 102 for one or more instances of a second item type of the two item types that qualify for file path indexes, such as items stored in indexable content 112, do not have file path indexes in file path indexes 105 and have a parent folder that has a file path index in file path indexes 105. Content repository 102 may receive the query from indexer 106, perform the query, and return a query result to indexer 106. The query result may indicate one or more resulting instances of the second item type that met all of the requirements of the query. In response, indexer 106 may create file path indexes for the resulting instances from the querying, may store each file path index in file path indexes 105, and may decrement the number of missing file path indexes associated with the second item type by the number of instances of the second item type returned in the query result and associated with file path indexes.

Because indexer 106 operates in a round robin schedule in querying for instances of item types associated with the number of missing file path indexes in a map, the process may repeat with the first item type and subsequently the second item type until the number of missing file path indexes associated with the first item type and the second item type both reaches zero.

If the query for instances of an item type that qualify for file path indexes in file path indexes 105, do not have file path indexes in file path indexes 105, and have a parent folder that has a file path index in file path indexes 105 returns zero instances of the item type, the zero instances does not necessarily indicate that every instance of the item type that qualify for file path indexes is now associated with a file path index. Because the query includes the qualifier of having a parent folder that has a file path index, if the parent folder for an instance of that item type is not yet associated with a file path index, then the instance of that item type that is a child of the unindexed parent folder is also not returned by the query until its parent folder is associated with a file path index in file path indexes 105.

Alternatively, instead of performing a query of different item types, indexer 106 may determine the folder types in content repository 102 that are subject to file path indexing and may, for each folder type that is subject to file path indexing, calculate the maximum possible number of folder instances that has one or more children that are missing file path indexes. For each folder type in content repository that has at least one folder instance having one or more children that are missing a file path index, indexer 106 may associate that folder type with the count of folder instances having one or more children that are missing file path indexes and may store that association in a map or a folder type candidate list (not shown). Similar to the above-described technique where item types are queried item type-by-item type in a round robin schedule, indexer 106 may, folder type-by-folder type in a round robin schedule for each of the folder types associated with the count of folder instances having one or more children that are missing file path indexes in the map or folder type candidate list, determine folder instances of the folder type in indexable content 112 that has one or more children that do not have associated file path indexes 105 and are filed in a folder that is associated with a file path index, and may create file path indexes for the children of those instances of the folder type that are missing file path indexes. If content repository 102 is queryable, such as by being a relational database, indexer 106 may determine the instances of the folder type in indexable content 112 that have children that do not have associated file path indexes 105 by sending queries to content repository 102. The number of instances of the folder type whose children are now all associated with file path indexes may be subtracted from the count of folder instances having children that are missing file path indexes associated with the folder type in the map or folder type candidate list.

For example, if indexer 106 identifies three folder types that each has one or more folder instances that have children that are missing file path indexes, indexer 106 may in turn, for each of the three folder types, send a query to content repository 102 for children of one or more instances of the folder type that qualify for file path indexes, such as items stored in indexable content 112, do not have file path indexes in file path indexes 105 and have a parent folder that has a file path index in file path indexes 105, create and associate a file path index with each child item returned as a result of the query, and subtract the count of instances of the folder type returned by the query from the count of total folder instances having children that are missing file path indexes associated with the folder type. Indexer 106 may repeat the process for each of the three folder types in turn until the count associated with each of the folder types reaches zero. In some examples, the count associated with each of the folder types will not reach zero because the count may include one or more instances in non-indexable content 114 that are missing file path indexes. Thus, instead of determining if the count associated with each of the folder types reaches zero, the process may end if all of the queries, consecutively one after another, all return zero items.

Indexer 106 may periodically issue queries to content repository 102 to keep file path indexes 105 up-to-date. In some examples, an enterprise administrator may manually cause indexer 106 to issue queries to content repository 102. In some examples, indexer 106 may automatically issue queries on a periodic basis.

Figure 1B:
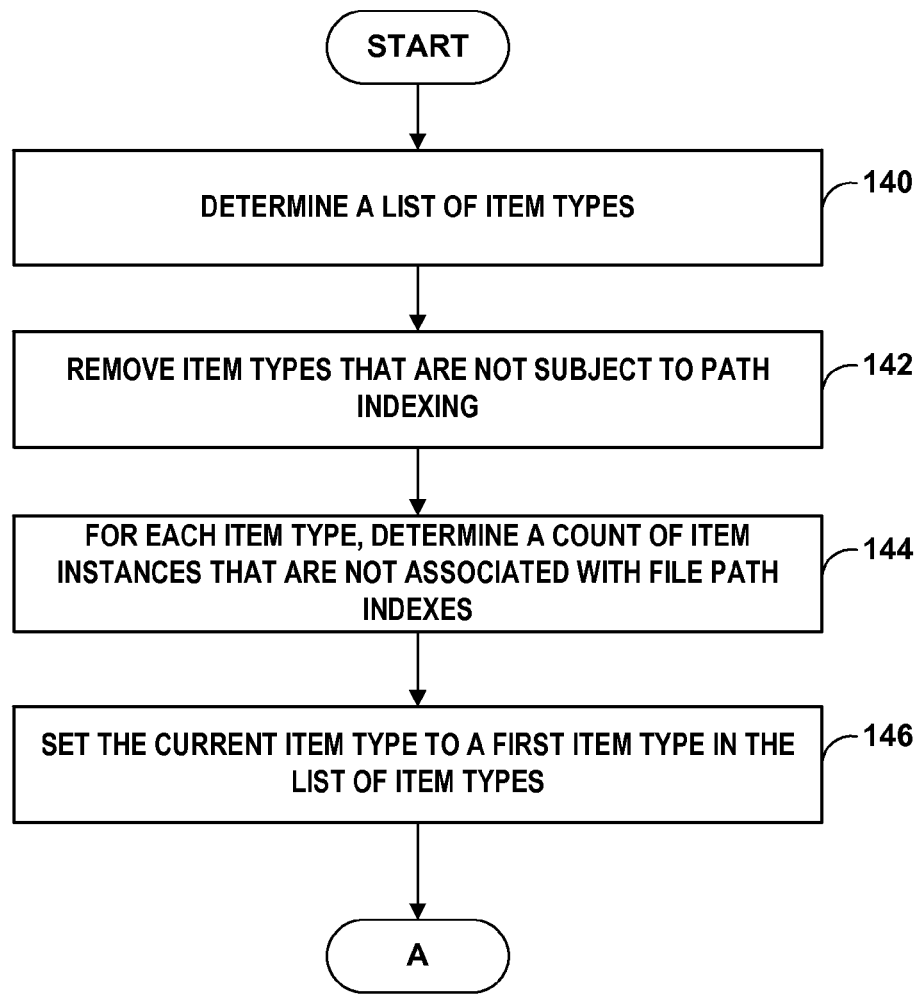
FIGS. 1B-1C is a flowchart illustrating an example method for querying and creating file path indexes according to some aspects of the disclosure.
Figure 1C:
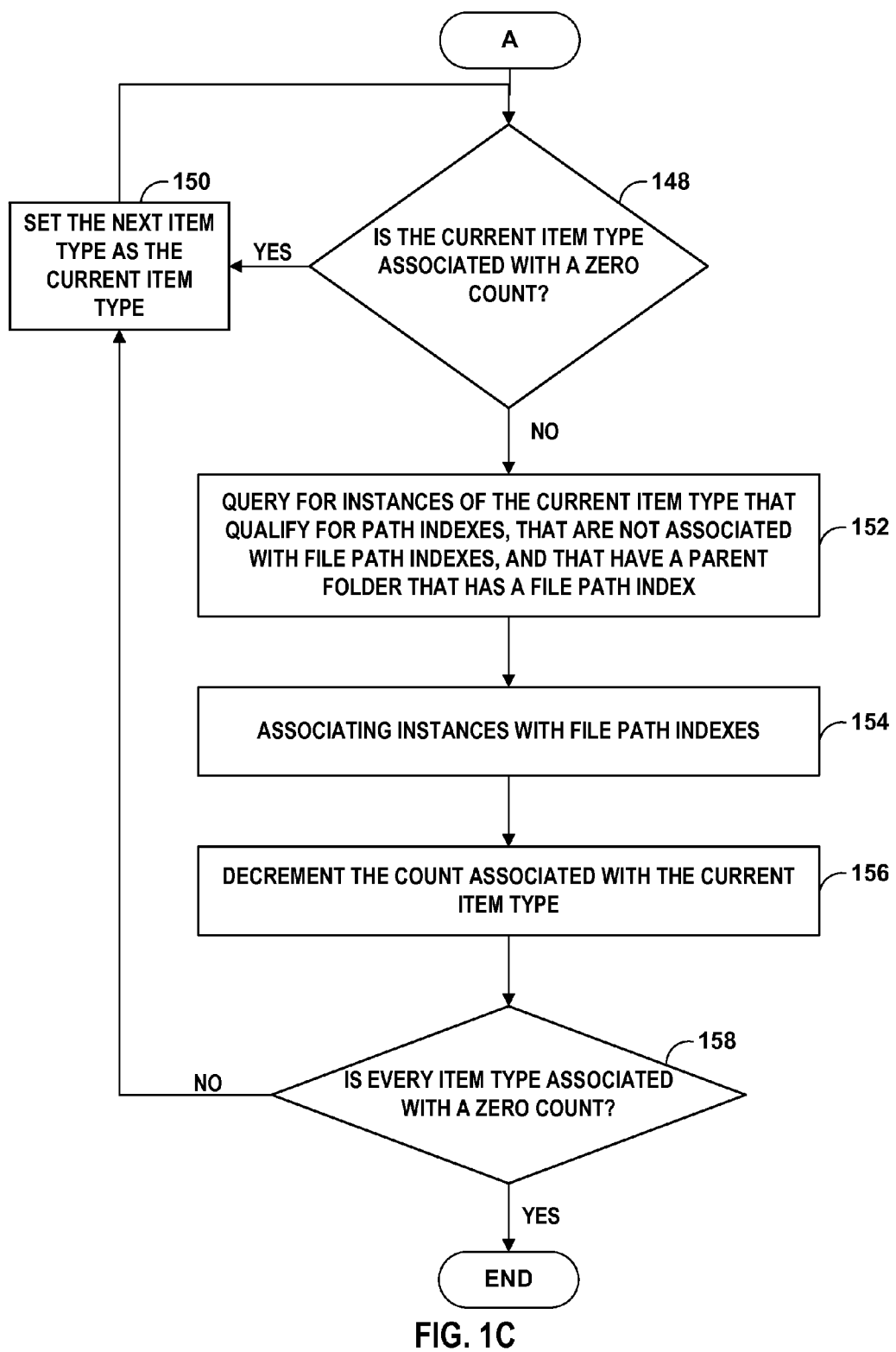

FIGS. 1B and 1C are a flowchart illustrating an example method for creating and maintaining file path indexes by querying for item types according to some aspects of the disclosure. As shown in FIG. 1B, indexer 106 may determine a list of item types in content repository 102 (140). Indexer 106 may remove from the list any item types that are not subject to file path indexing (142). For example, item types that are only associated with items in non-indexable content 114 and are not associated with items in indexable content 112 may be removed from the list. For each item type in the list, indexer 106 may determine a count of item instances that qualify for file path indexes but are not associated with file path indexes (144). Indexer 106 may associate each item type having one or more instances that qualify for path indexes, are not associated with file path indexes, and that are filed in one or more folders in content repository 102 with a count of the one or more instances, and may store the association in a map.

Indexer 106 may, for each item type associated with the count of the one or more instances in turn in a round robin sequence until the count of the one or more instances reaches zero for each item type, process the item types to associate instances of the item types with file path indexes. Indexer 106 may set a first item type in the map as the current item type (146). As shown in FIG. 1C, indexer 106 may determine if the current item type is associated with a zero count of item instances in the map (148). If the item instance is associated with a zero count of item instances, indexer 106 may set the next item type in the map as the current item type (150) and may determine if the current item type is associated with a zero count of item instances (148). Because indexer 106 processes the item types in a round-robin fashion, if the current item type is the last item type in the map, the indexer 106 may circle back to the first item type in the map as the next item type. If the item instance is not associated with a zero count of item instances, indexer 106 may query content repository 102 for instances of the current item type that qualify for file path indexes, that are not associated with file path indexes, and that have a parent folder that has a file path index (152). The query 152 can find unindexed item instances at different levels of a folder tree as long as the item has an indexed parent folder because the query 152 queries content repository 102 for all item instances in content repository 102 that meet the conditions of the query 152 without regards as to the level each of those item instances are at in the folder tree, as opposed to some techniques that traverse the folder tree a level at a time. Responsive to the query returning one or more instances of the current item type, indexer 106 may associate the returned one or more instances of the current item type with file path indexes (154) and may adjust the count associated with the current item type by decrementing the count associated with the current item type in the map by the number of instances that were associated with file path indexes (156). Indexer 106 may determine if every item type in the map is associated with a zero count (158). If so, then the process may end. However, if not every item type in the map is associated with a zero count, then indexer 106 may repeat the process with the next item type in the map, including setting the next item type as the current item type (150). As discussed above, because indexer 106 processes the item types in a round-robin fashion, if the current item type is the last item type in the map, the indexer 106 may circle back to the first item type in the map as the next item type.

Figure 1D:
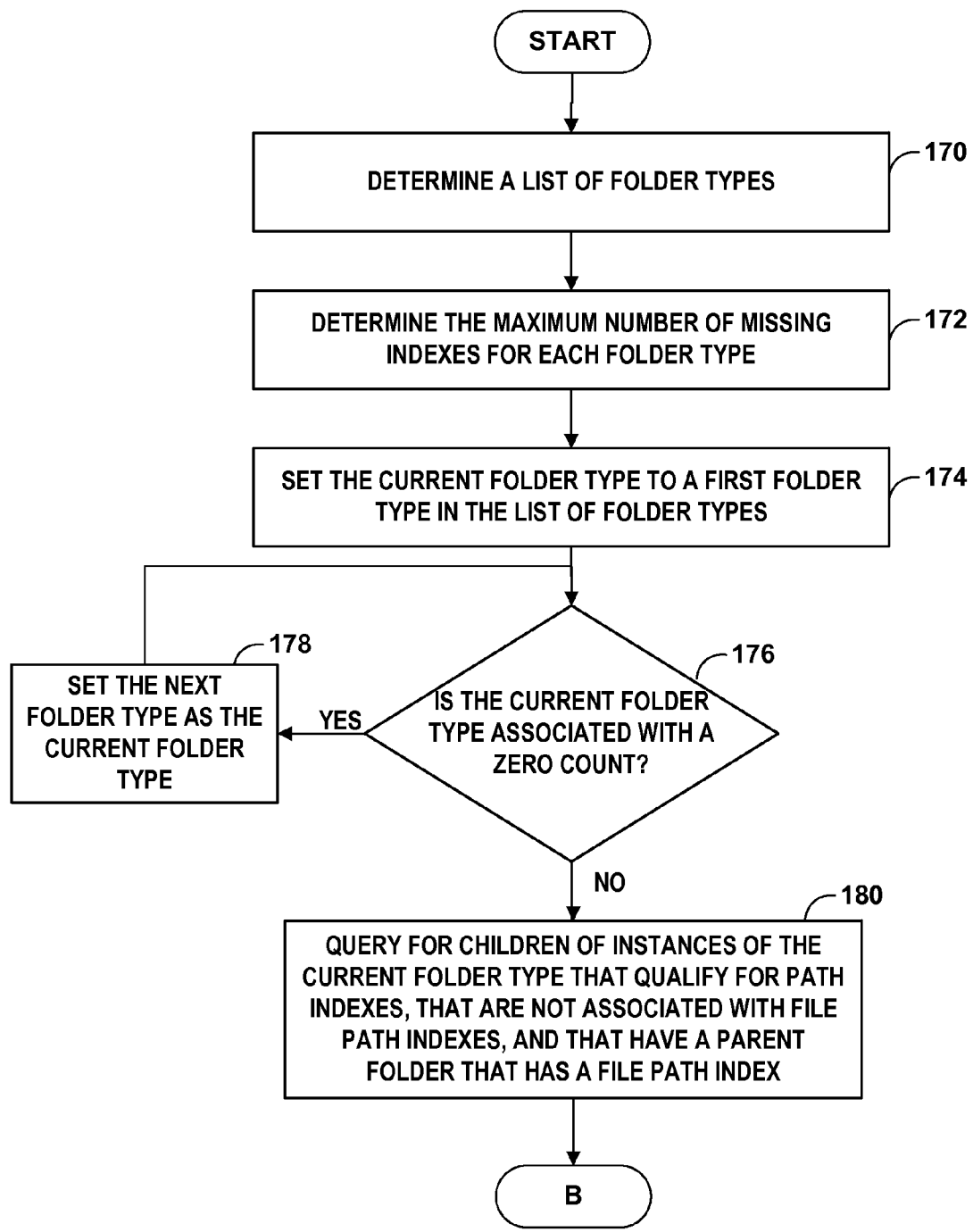
FIGS. 1D-1E is a flowchart illustrating an example method for querying and creating file path indexes according to some aspects of the disclosure.
Figure 1E:
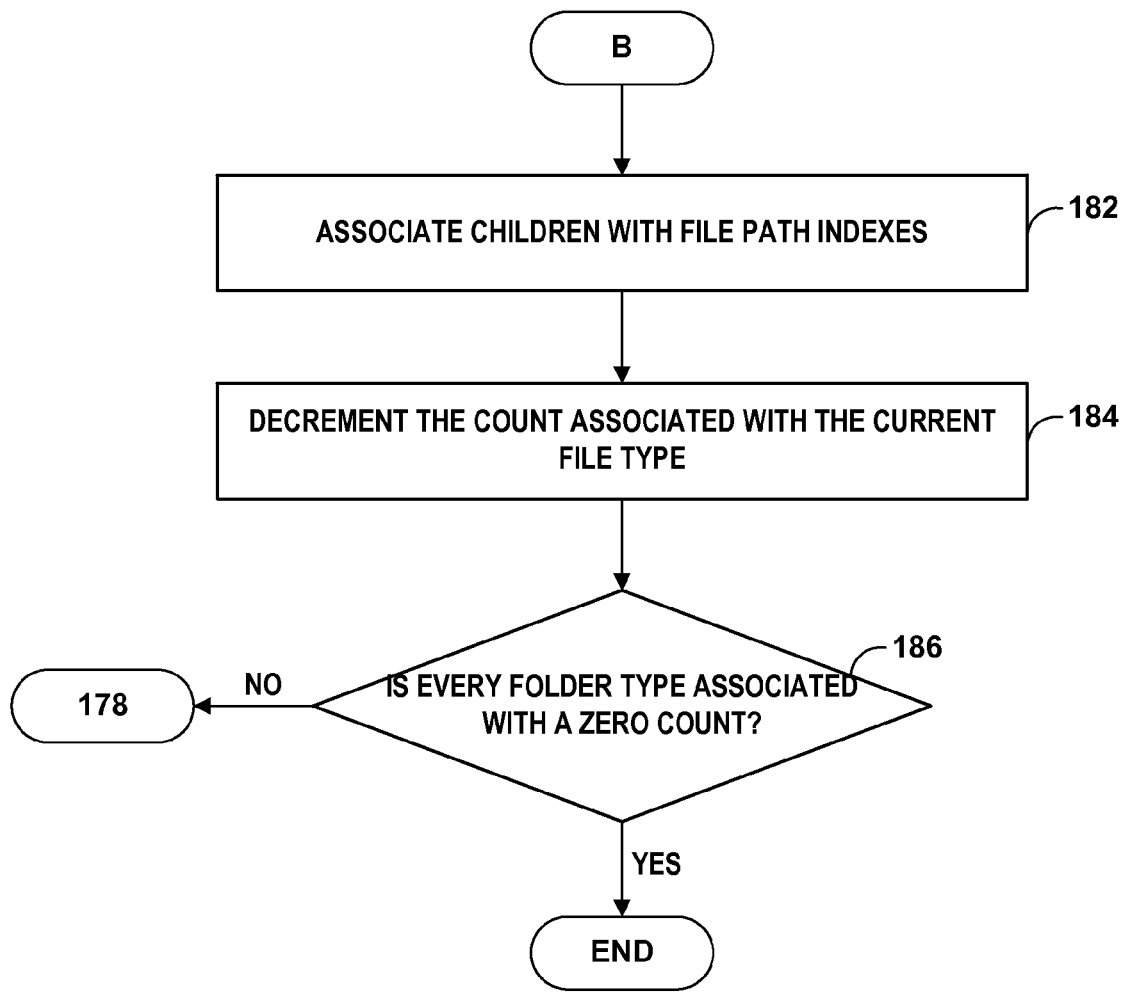

FIGS. 1D and 1E are a flowchart illustrating an example method for creating and maintaining file path indexes by querying for children of folder types according to some aspects of the disclosure. As shown in FIG. 1D, indexer 106 may determine a list of folder types in content repository 102 (170). Indexer 106 may add all types that are declared to only support folders to the list, may eliminate all types that are declared to only support documents, and may add types (if any) that support both folders and documents and are used as folder types. Indexer 106 may determine, for each file type, the maximum number of instances, for each folder type, that have one or more children that are missing file path indexes (172), and indexer 106 may add each folder type with more than zero instances that have one or more children that are missing file path indexes to a folder type candidate list, including associating each folder type with one or more instances that have one or more child items that are not associated with file path indexes in content repository 102 out of a plurality of folder types with a count of the one or more instances that include one or more children that are missing file path indexes.

Indexer 106 may, for each folder type associated with the count of the one or more instances in turn in a round robin sequence until the count of the one or more instances reaches zero for each folder type, process the instances of the folder type to associate any children of the instances that are missing file path indexes with file path indexes. Indexer 106 may set the current folder type to a first folder type in the list of folder types (174). Indexer 106 may determine if the current folder type is associated with zero instances that have one or more children that are missing file path indexes in the folder type candidate list. If the current folder type is associated with zero instances having children that are missing file path indexes in the folder type candidate list, indexer 106 may set the next folder type in the folder type candidate list as the current folder type (178) and may determine if the current folder type is associated with zero missing file path indexes in the folder type candidate list (176). Because indexer 106 processes the folder types in a round-robin schedule, if the current folder type is the last folder type in the folder type candidate list, the indexer 106 may advance to the next folder type by circling back to the first folder type in the folder type candidate list and set that folder type as the next folder type. If the folder type is not associated with a zero count of missing indexes, indexer 106 may query for instances of the folder type that have one or children that (1) quality for path indexes, (2) are not associated with file path indexes, and (3) have a parent folder that has a file path index (180). The query 180 can find folder instances with unindexed child items at different levels of a folder tree as long as the unindexed child items have an indexed parent folder because the query 180 queries content repository 102 for all folder instances in content repository 102 that meet the conditions of the query 180 without regards as to the level each of those folder instances are at in the folder tree, as opposed to some techniques that traverse the folder tree a level at a time. As shown in FIG. 1E, if the query returns one or more children of folder instances of the current folder type, indexer 106 may associate the returned one or more children of folder instances of the current folder type with file path indexes (182) and may decrement the count associated with the current folder type in the folder type candidate list by the number of folder instances of the folder type that had one or more children be associated with file path indexes (184). Indexer 106 may determine if every folder type in the folder type candidate list is associated with a zero count in the folder type candidate list (186). If so, then the process may end. However, if not every folder type in the map is associated with a zero count, then indexer 106 may repeat the process with the next folder type in the folder type candidate list, including setting the next folder type as the current folder type (178). As discussed above, because indexer 106 processes the folder types in a round-robin fashion, if the current folder type is the last folder type in the folder type candidate list, the indexer 106 may advance to the next folder type by circling back to the first folder type in the folder type candidate list and setting the first folder type as the current folder type.

Figure 1F:
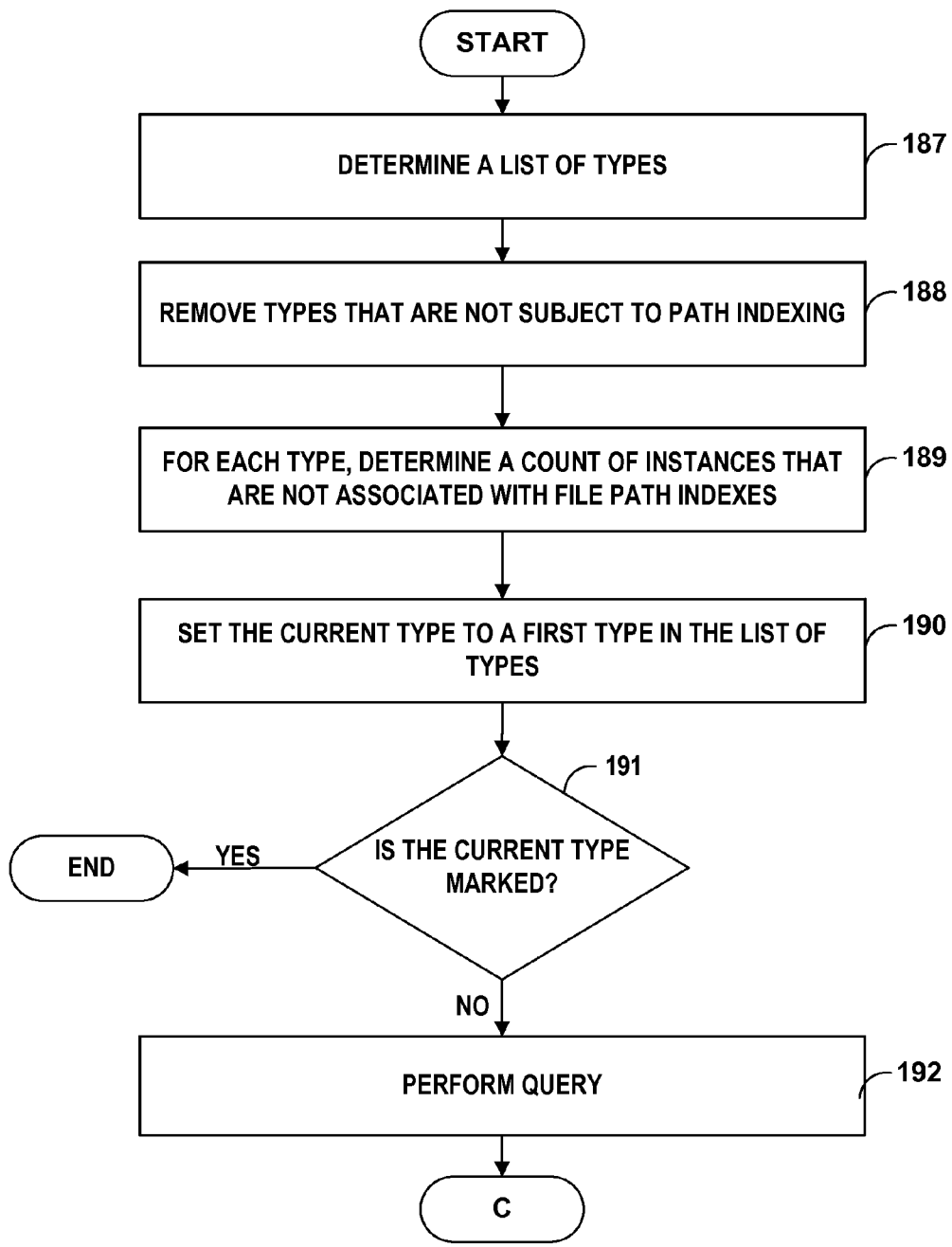
FIGS. 1F and 1G are a flowchart illustrating an example method for terminating the querying for instances missing file path indexes according to some aspects of the disclosure.
Figure 1G:
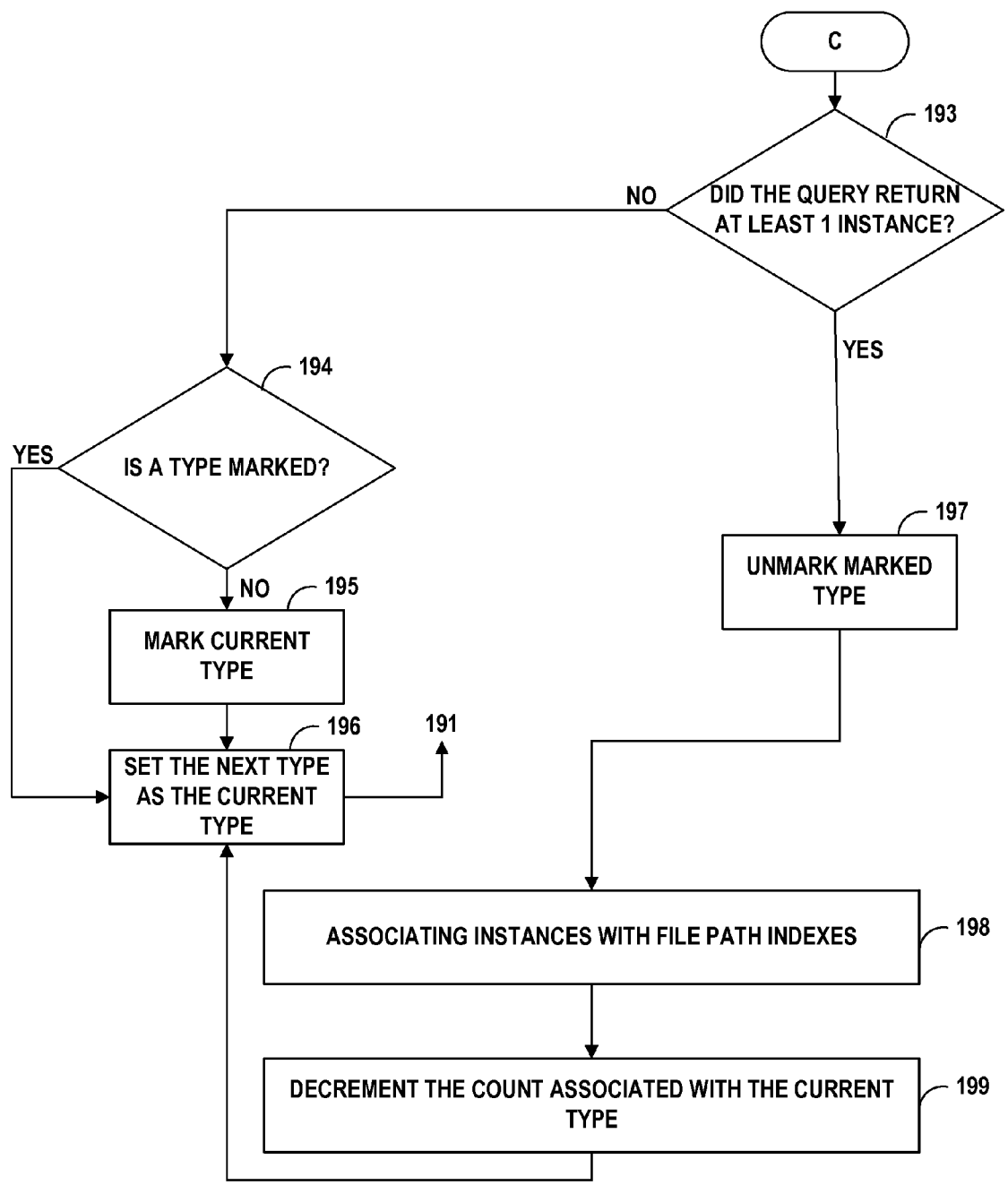

FIGS. 1F and 1G are a flowchart illustrating an example method for terminating the querying for instances missing file path indexes according to some aspects of the disclosure. The method may be applicable to terminate the method illustrated in FIGS. 1B and 1C and the method illustrated in FIGS. 1D and 1E. The method illustrated in FIGS. 1F and 1G may be useful if one or more instances of an item type or a folder type is stored in non-indexable content 114. For example, if not every item type or folder type will eventually reach a zero count, then an item type or folder type that will never reach a zero count may prevent the termination of querying for instances that are missing file path indexes. Instead indexer 106 may determine that there are no instances in indexable content 112 that are missing file path indexes if each query for instances of types returns no instances in sequence, and the querying may terminate responsive to that determination.

To determine if each query for instances of types returns no instances, a type may be marked if the query for instances of the type returns no instances and if the immediately preceding query for instances of the type immediately preceding the type returned at least one instance. As long as subsequent queries for instances of subsequent types return no instances, the marked type may remain marked. However, if a subsequent query for instances of a subsequent type returns at least one instance, the marked type may be unmarked. If the queries loop back to the marked type and the marked type remains marked, then it may be determined that there are no instances in indexable content 112 that are missing file path indexes, and the querying may terminate. Some examples of marking a specified type may include associating the specified type with a marker or any other indication that the specified type is marked, setting a marked type variable to the specified type, or any other techniques of marking the specified type.

As shown in FIG. 1F, indexer 106 may determine a list of types (e.g., item types or folder types) (187) and may remove the types from the list of types that are not subject to file path indexing (188). Indexer 106 may, for each type in the list of types, a count of instances that are not associated with file path indexes (for item types) or a count of instances that have one or more child items that are not associated with file path indexes (for folder types) (189). Indexer 106 may set the current type to the first type in the list of types (190). Indexer 106 may determine if the type is marked (191). Determining if the type is marked may, in some examples, include determining if the type is associated with a mark or an indication that the type is marked, or may also include determining if a marked type variable is set to the type. If the type is marked, then the process may end. If the type is not marked, indexer 106 may perform a query, such as query 152 shown in FIG. 1C for item types and query 180 shown in FIG. 1D for folder types, for instances with missing file path indexes (192). As shown in FIG. 1G, indexer 106 may determine if the query 191 returned at least 1 instance (192). If the query 191 returned at least 1 instance of the type, indexer 106 may unmark any currently marked types (197), associate the instance with file path indexes (or associate the child item of the folder instance with file path indexes) (198), decrement the count associated with the current type (199), set the next type as the current type (196), and perform the query for the current type (191).

If the query 191 did not return at least 1 instance of the type, indexer 106 may determine if a type is currently marked (194). If no types are currently marked, indexer 106 may mark the current type (195), set the next type as the current type (196), and perform the query for the current type (191). If a type is currently marked, indexer may set the next type as the current type (191) and perform the query for the current type (191).

Figure 2A:
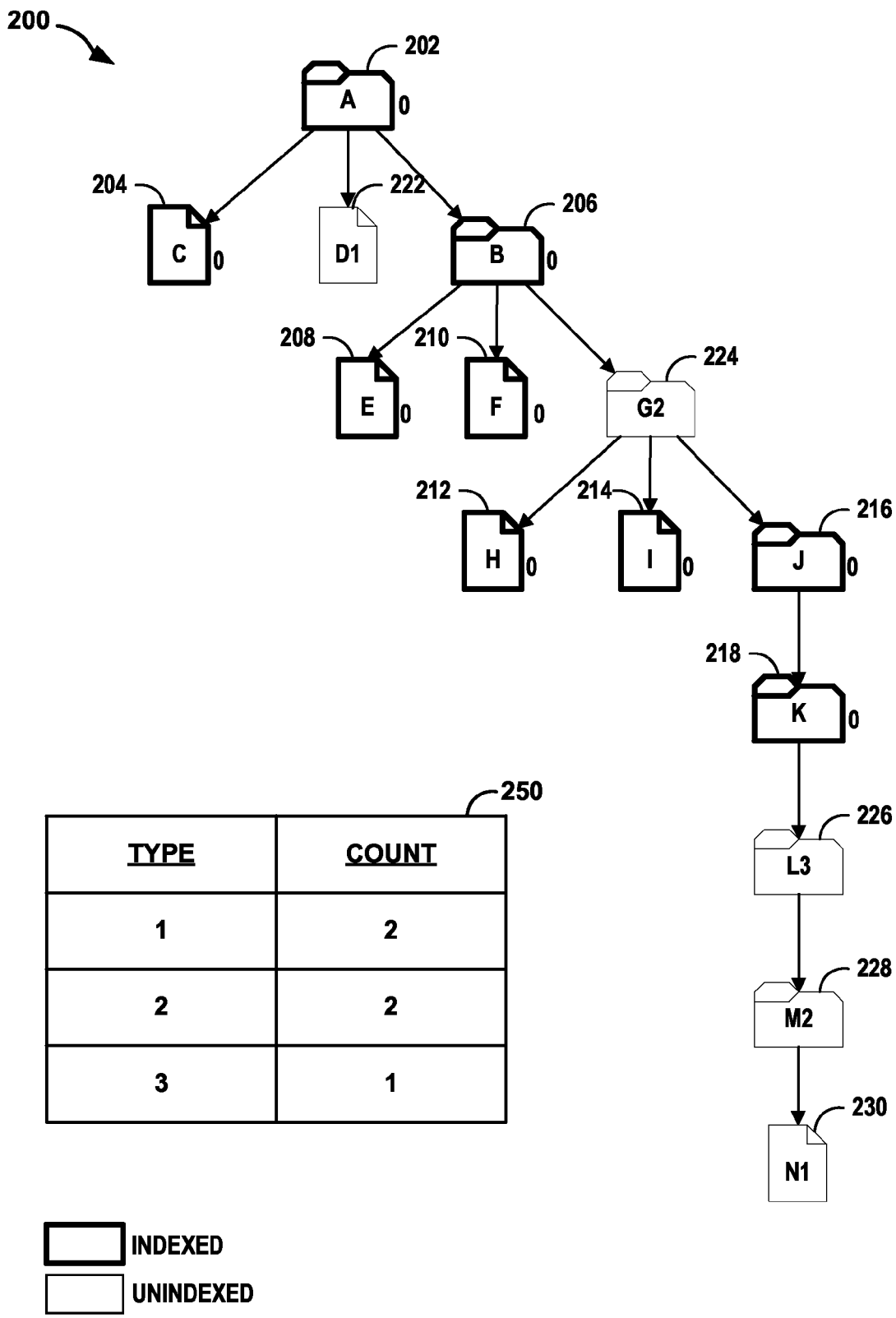
FIGS. 2A-2F are conceptual diagrams illustrating an example technique for indexing files in a folder tree according to some aspects of the disclosure.

FIGS. 2A-2F are conceptual diagrams illustrating an example technique for indexing files in a folder tree by an example indexer, such as indexer 106 shown in FIG. 1A, according to aspects of the disclosure. As shown in FIG. 2A, folder tree 200 includes files and directories arranged hierarchically, so that a folder may contain files and directories, and those directories may contain files and directories, and so on.

Folder A 202, file C 204, folder B 206, file E 208, file F 210, file H 212, file I 214, folder J 216, and folder K 218 each already have an associated file path index, and thus are considered to be indexed. In contrast, file D1 222, folder G2 224, folder L3 226, folder M2 228, and file N1 230 do not have an associated file path index, and thus are considered to not be indexed. As shown in FIG. 2A, items that are identified with a character together with a number may be associated with a type identified by the number, so that file D1 222 and file N1 230 may be associated with type 1, folder G2 224 and folder M2 228 may be associated with type 2, and folder L3 226 may be associated with type 3.

An example indexer, such as indexer 106, may, for each type of items, may determine how many instances of each item type does not have an associated file path index. In the example folder tree 200, indexer 106 may determine that item type 1 has two instances that do not have an associated file path index because file D1 222 and file N1 230 do not have associated file path indexes, that item type 2 has two instances that do not have an associated file path index because folder G2 224 and folder M2 228 do not have associated file path indexes, and that item type 3 has one instance that does not have an associated file path index because folder L3 226 does not have an associated file path index.

For each item type that indexer 106 determines to have a non-zero count of instances that do not have associated file path indexes, indexer 106 may store, in map 250 in computing system 100, an association of the item type and the count of the instances that do not have associated file path indexes. For example, an association of type 1 with 2 instances that do not have associated file path indexes, an association of type 2 with 2 instances that do not have associated file path indexes, and an association of type 3 with 1 instance that does not have an associated file path index may be stored in the map.

For each item type that has a non-zero count of instances that do not have associated file path indexes, indexer 106 may, in a round robin schedule, query content repository 102 for instances of the type that (1) qualify for file path indexes, (2) do not have file path indexes, and (3) have a parent folder that is associated with a file path index, and associate the item instances, if any, returned by the query with file path indexes. The round robin schedule denotes that indexer 106 may repeatedly cycle through the item types in order in a circular fashion until instances that are missing file path indexes are associated with file path indexes. Indexer 106 may decrement the count of instances that do not have associated file path indexes associated with the item type in map 250 by the number of instances returned as a result of the query and associated with file path indexes. If the count associated with the item type in map 250 reaches 0, the item type and associated count may be removed from map 250, and indexer 106 may no longer query for instances of that item type. In some examples, an associated count for the item type may never reach zero if there are one or more instances of the item type stored in non-indexable content 114, because the query may only query for and return instances that qualify for file path indexes.

Figure 2B:
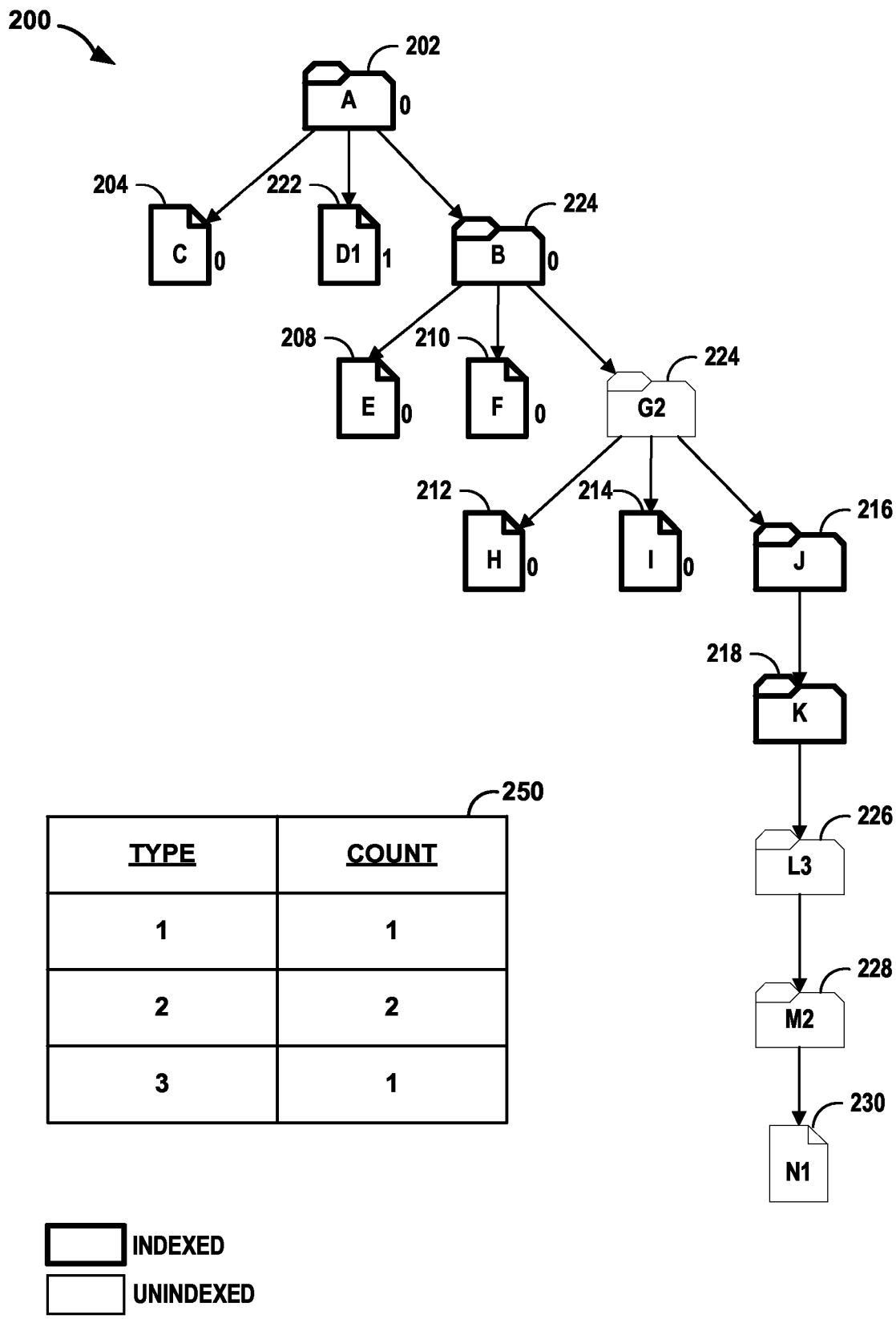

In one example, for the folder tree 200 shown in FIG. 2A, indexer 106 may first query for instances of item type 1 that (1) qualify for file path indexes, (2) do not have file path indexes, and (3) have a parent folder that is associated with a file path index, and may associate the instances returned by the query, if any, with file path indexes. As shown in FIG. 2B, file D1 222 has been associated with a file path index as a result, and the count associated with type 1 in map 250 has been decremented from 2 to 1.

Figure 2C:
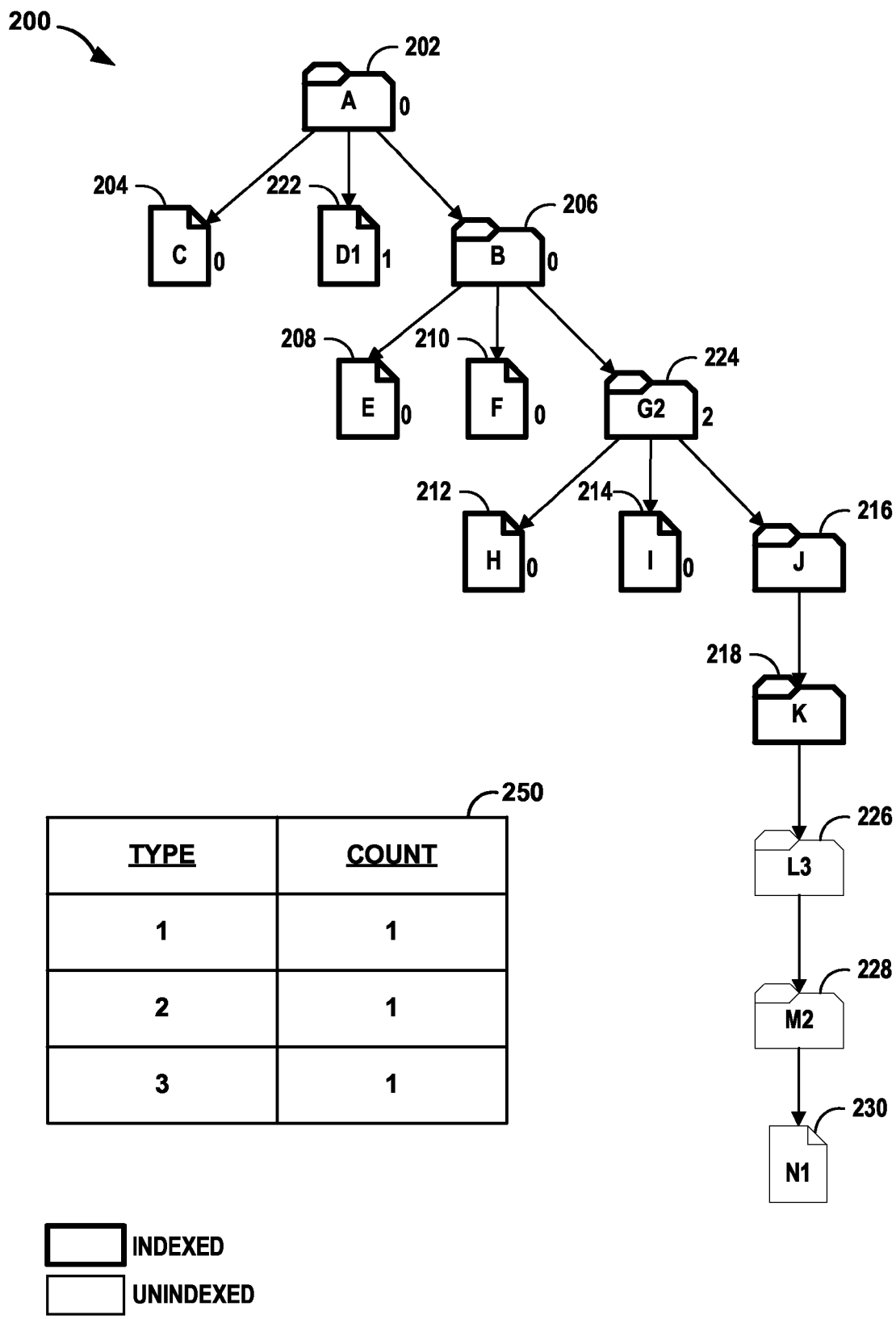

In one example, after querying for instances of item type 1, indexer 106 may query for instances of item type 2 that (1) qualify for file path indexes, (2) do not have file path indexes, and (3) have a parent folder that is associated with a file path index, and may associate the instances returned by the query with file path indexes. As shown in FIG. 2C, folder G2 224 has been associated with a file path index as a result, and the count associated with type 2 in map 250 has been decremented from 2 to 1.

Figure 2D:
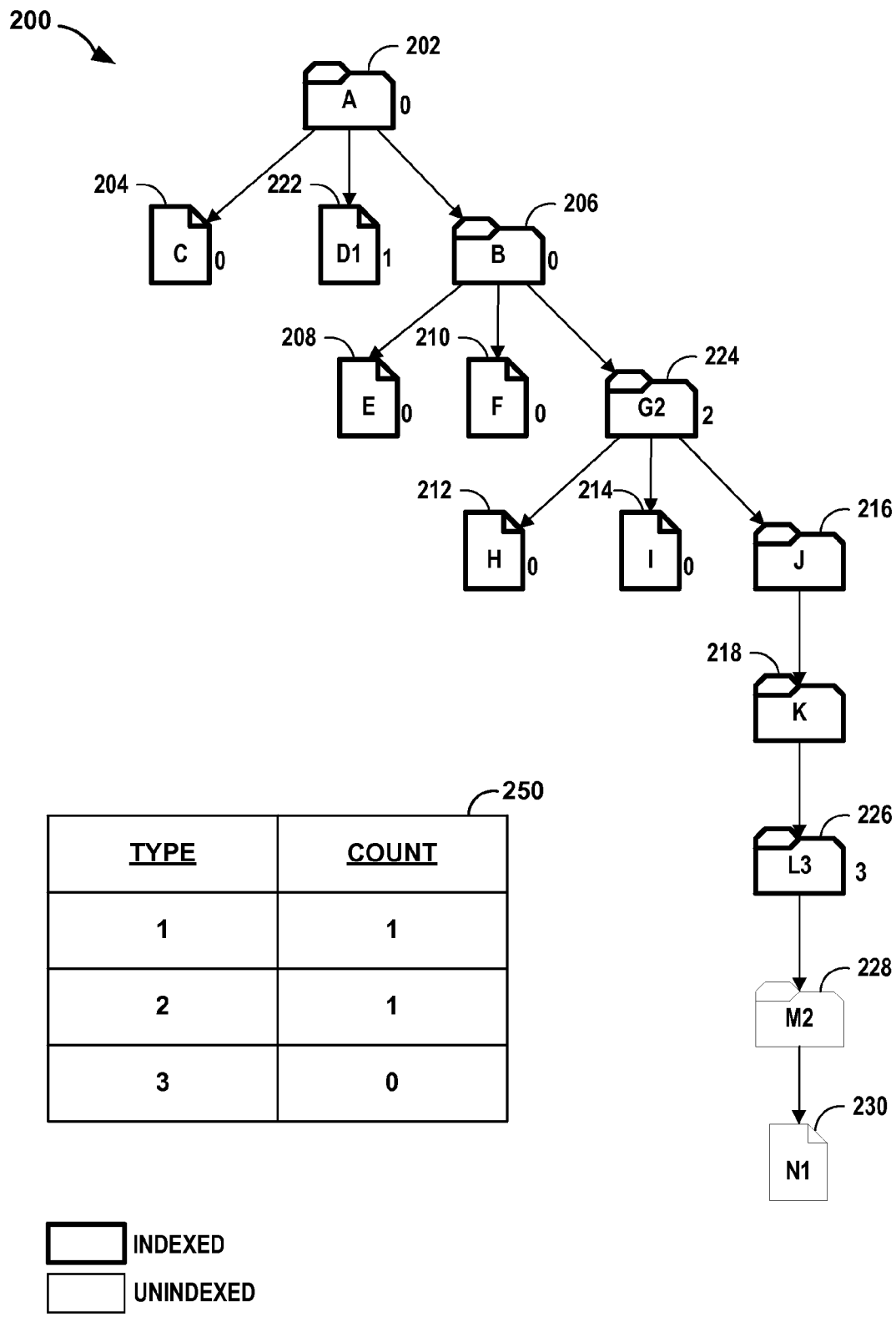

In one example, after querying for instances of item type 2, indexer 106 may query for instances of item type 3 that (1) qualify for file path indexes, (2) do not have file path indexes, and (3) have a parent folder that is associated with a file path index, and may associate the instances returned by the query with file path indexes. As shown in FIG. 2D, folder L3 226 has been associated with a file path index as a result, and the count associated with type 3 in map 250 has been decremented from 1 to 0. In some examples, if the count associated with an item type becomes 0, the item type is removed from consideration, so that indexer 106 will not continue to query for instances of that item type. Thus, if item type 3 is removed from consideration, indexer 106 will no longer query for instances of item type 3. In some examples, the item type and its associated count may also be removed from map 250 if the count associated with the item type becomes 0.

In one example, after querying for instances of item type 3, indexer 106 may re-query for instances of item type 1 that (1) qualify for file path indexes, (2) do not have file path indexes, and (3) have a parent folder that is associated with a file path index, and may associate the instances returned by the query with file path indexes. Because the remaining instance of type 1 that qualify for file path indexes and is not associated with a file path index is file N1 230, which is a child of folder M2 228, which itself is not associated with a file path index, the query will not return any instances of item type 1.

In some examples, indexer 106 tracks the number of resulting items returned by the query above to determine whether all of the items in indexable content 112 of content repository 102 that are missing file path indexes are now associated with file path indexes by tracking the number of resulting items returned by the query above. If the current query returns zero items and if the query previous to the current query returned one or more items, indexer 106 may mark the item type associated with the current query, such as by setting a bit in map 250. If a subsequent query returns one or more items, then indexer 106 may unmark the previously marked item type. However, if indexer 106 loops through the item types in map 250 and reaches an already-marked item type, then indexer 106 may determine that all of the items in indexable content 112 of content repository 102 that are missing file path indexes are now associated with file path indexes, and the process may terminate. Thus, because the query for instances of item type 1 did not return any items, and because the query for instances of item type 3 immediately previous to the query for instances of item 1 did return at least one item instance, indexer 106 may mark item type 1.

Figure 2E:
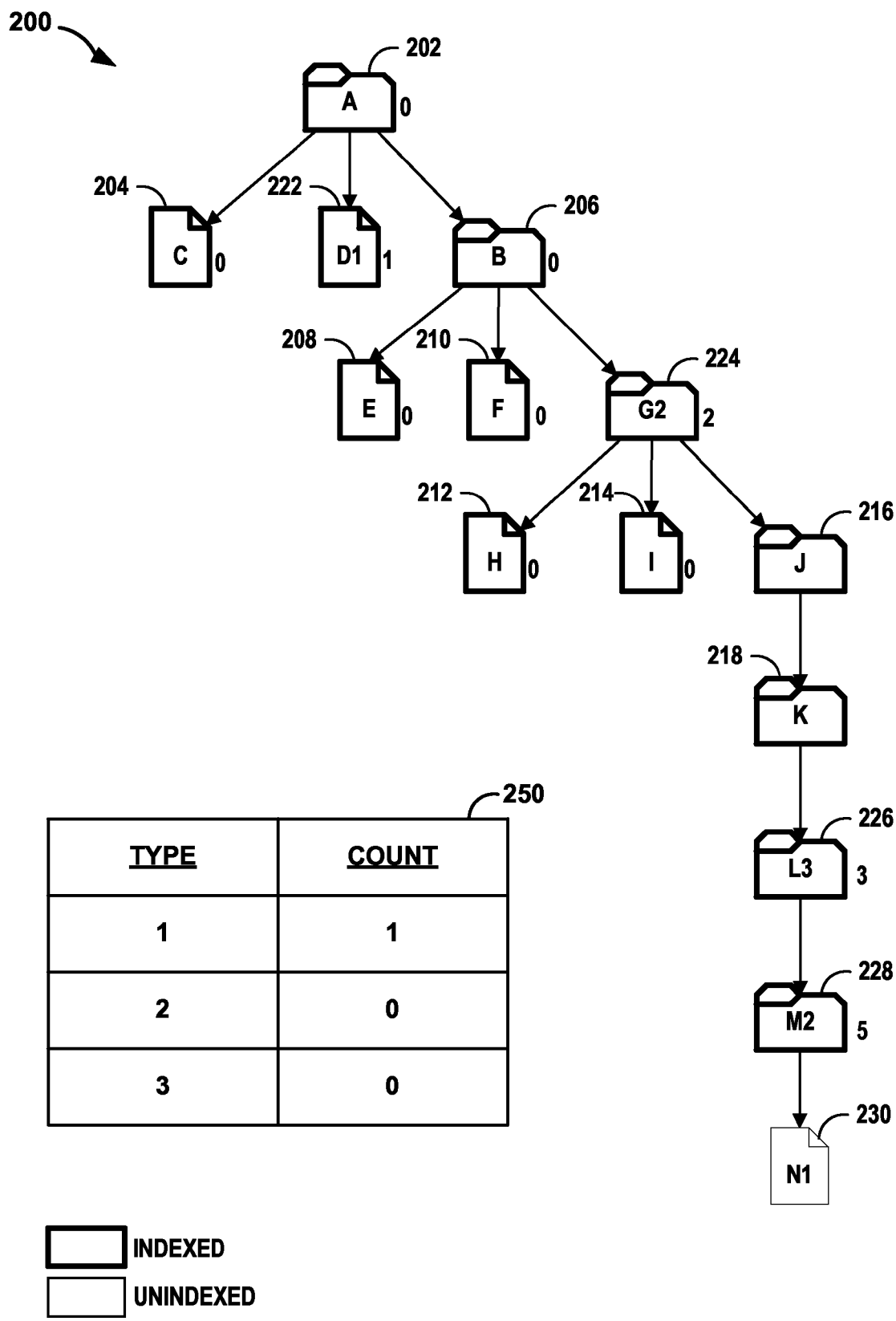

In one example, after querying for instances of item type 1, indexer 106 may re-query for instances of item type 2 that (1) qualify for file path indexes, (2) do not have file path indexes, and (3) have a parent folder that is associated with a file path index, and may associate the instances returned by the query with file path indexes. Folder M2 228 may be returned as a result of the query and, as shown in FIG. 2E, indexer 106 may associate folder M2 228 with a file path index. Indexer 106 may decrement the count associated with item type 2 in map 250 from 1 to 0. Because the query returned one item instance, item type 1 may be unmarked.

Figure 2F:
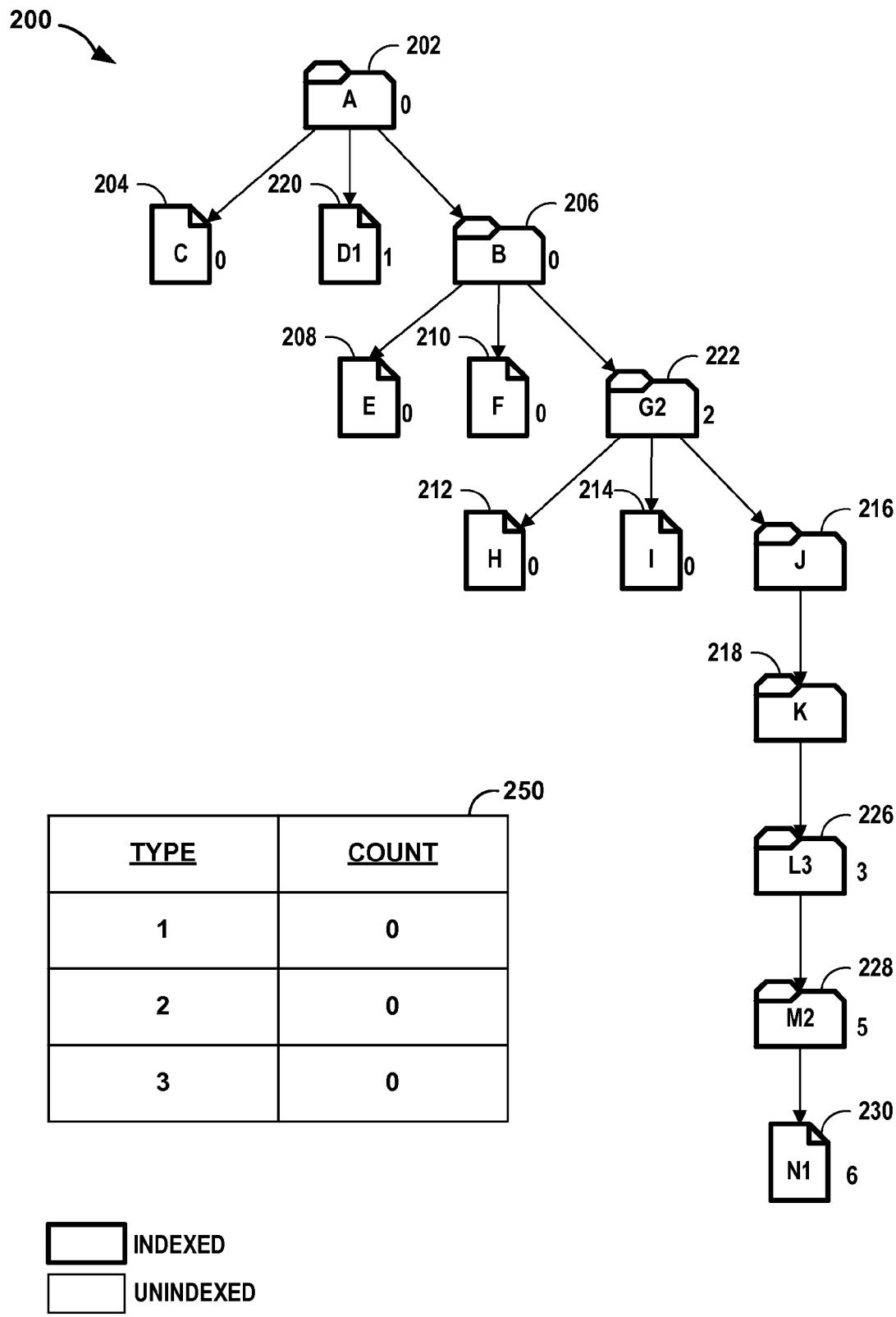

In some examples, because item type 3 is associated with a count of 0 in map 250, indexer 106 may skip querying item type 3. In deciding whether to mark item type 3, skipping querying of item type 3 may be treated as the query of item type 3 returning zero items. Thus, indexer 106 may mark item type 3 in map 250. Instead of querying for instances of item type 3 after querying for instances of item type 2, indexer 106 may re-query for instances of item type 1 that (1) qualify for file path indexes, (2) do not have file path indexes, and (3) have a parent folder that is associated with a file path index, and may associate the instances returned by the query with file path indexes. As shown in FIG. 2F, file N1 230 has been associated with a file path index as a result, and the count associated with type 3 in map 250 has been decremented from 1 to 0. Because the query of item 1 returned an item instance, previously marked item 3 may be unmarked.

After querying for item type 1, indexer 106 may query for instances of item type 2. However, as discussed above, because item type 2 is associated with a count of zero in map 250, item type 2 may be skipped. Item type 2 may also be marked because item type 2 is skipped and because the immediately preceding query for instances of item type 1 returned at least one instance. Because all three item types in map 250 have an associated count of 0, queries for item types 3 and 1 will also be skipped by indexer 106. In addition, when indexer 106 once again reaches item type 2, indexer 106 may end the query in response to determining that item type 2 is marked and that a query for instances of item type 2 would return zero instances. Thus, indexer 106 may determine that all items missing file path indexes in indexable content 112 are now associated with file path indexes and may terminate the indexing process.

Figure 3A:
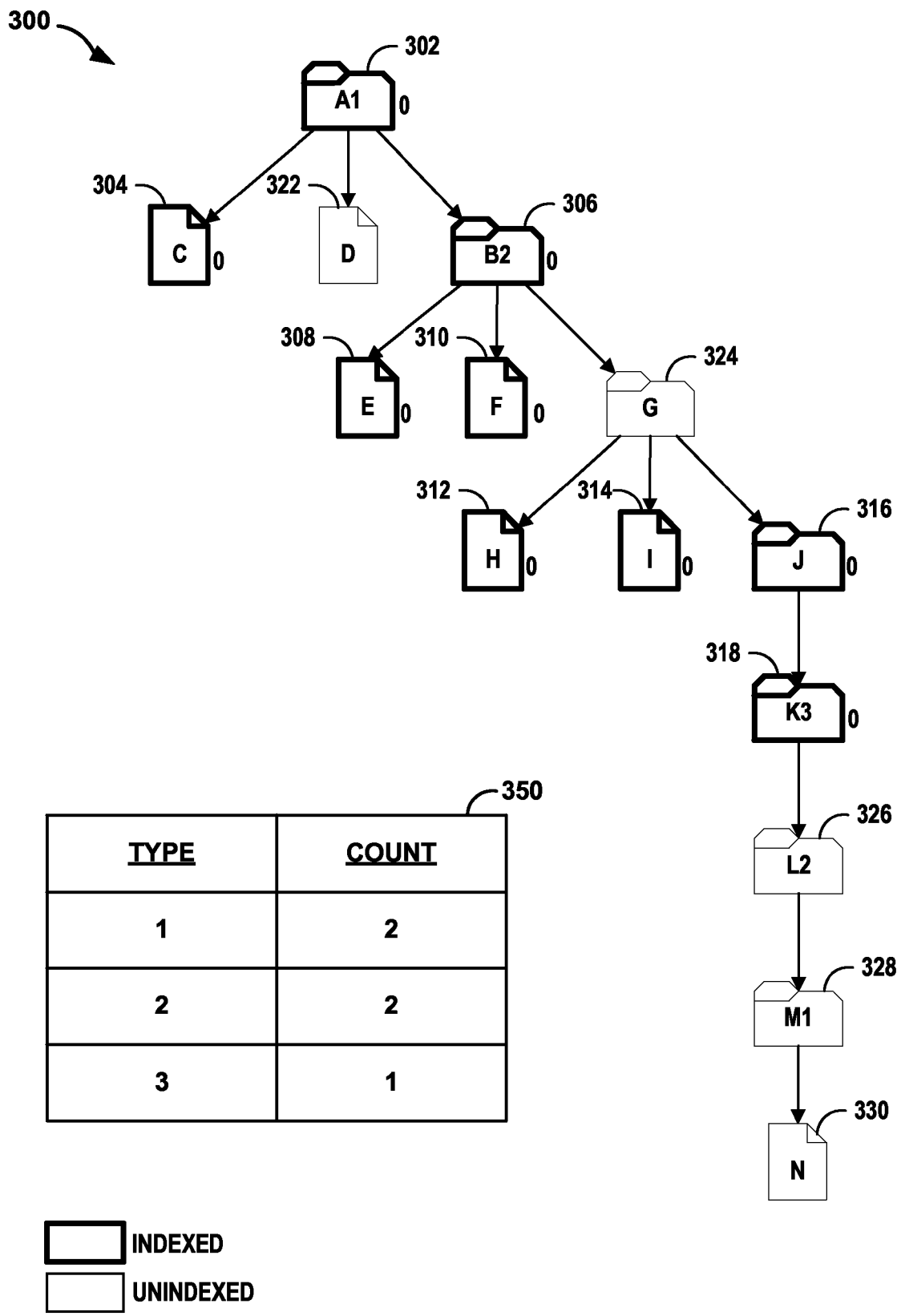
FIGS. 3A-3F are conceptual diagrams illustrating an example technique for indexing files in a folder tree according to some aspects of the disclosure.

Instead of querying for item types, indexer 106 may also query for folder types. FIGS. 3A-3F are conceptual diagrams illustrating an example technique for indexing files in a folder tree by an example indexer, such as indexer 106 shown in FIG. 1A, according to aspects of the disclosure. As shown in FIG. 3A, folder tree 300 includes files and directories arranged hierarchically, so that a folder may contain files and directories, and those directories may contain files and directories, and so on.

Folder A 302, file C 304, folder B 306, file E 308, file F 310, file H 312, file I 314, folder J 316, and folder K 318 each already have an associated file path index, and thus are considered to be indexed. In contrast, file D1 322, folder G2 324, folder L3 326, folder M2 328, and file N1 330 do not have an associated file path index, and thus are considered to not be indexed. As shown in FIG. 3A, items that are identified with a character together with a number may be associated with a type identified by the number, so that file D1 322 and file N1 330 may be associated with type 1, folder G2 324 and folder M2 328 may be associated with type 2, and folder L3 326 may be associated with type 3.

An example indexer, such as indexer 106, may, for each type of folder, determine how many instances of each folder type has child items that do not have an associated file path index. In the example folder tree 300, indexer 106 may determine that folder type 1 has two folder instances having children that do not have an associated file path index because folder A1 302 includes a child file D 322 that does not have an associated file path index, and because folder M1 328 includes a child file N 330 that also does not have an associated file path index. Indexer 106 may determine that folder type 2 has two folder instances having children that do not have an associated file path index because folder B2 306 includes a child folder G 324 that does not have an associated file path index, and because folder L2 326 includes a child folder M1 328 that also does not have an associated file path index. Indexer 106 may determine that folder type 3 has one folder instance having children that do not have an associated file path index because folder K3 318 includes a child folder L2 326 that does not have an associated file path index.

For each folder type that indexer 106 determines to have a non-zero count of instances having children that do not have associated file path indexes, indexer 106 may store, in map 350 in computing system 100, an association of the folder type and the count of the instances having children that do not have associated file path indexes. For example, an association of folder type 1 with a count of 2 instances having children that do not have associated file path indexes, an association of folder type 2 with a count of 2 instances having children that do not have associated file path indexes, and an association of folder type 3 with a count of 1 instance having children that does not have an associated file path index may be stored in map 350.

For each folder type that has a non-zero count of instances having children that do not have associated file path indexes, indexer 106 may, in a round robin scheme, query content repository 102 for instances of the folder type having children that (1) qualify for file path indexes, (2) do not have file path indexes, and (3) have a parent folder that is associated with a file path index, and associate the children of folder instances, if any, returned by the query with file path indexes. The round robin scheme denotes that indexer 106 may repeatedly cycle through the folder types in order. Indexer 106 may decrement the count of instances having children that do not have associated file path indexes associated with the folder type in map 350 by the number of folder instances returned as a result of the query that has its children associated with file path indexes. If the count associated with the folder type in map 350 reaches 0, the folder type and associated count may be removed from map 350, and indexer 106 may no longer query for instances of that folder type.

Figure 3B:
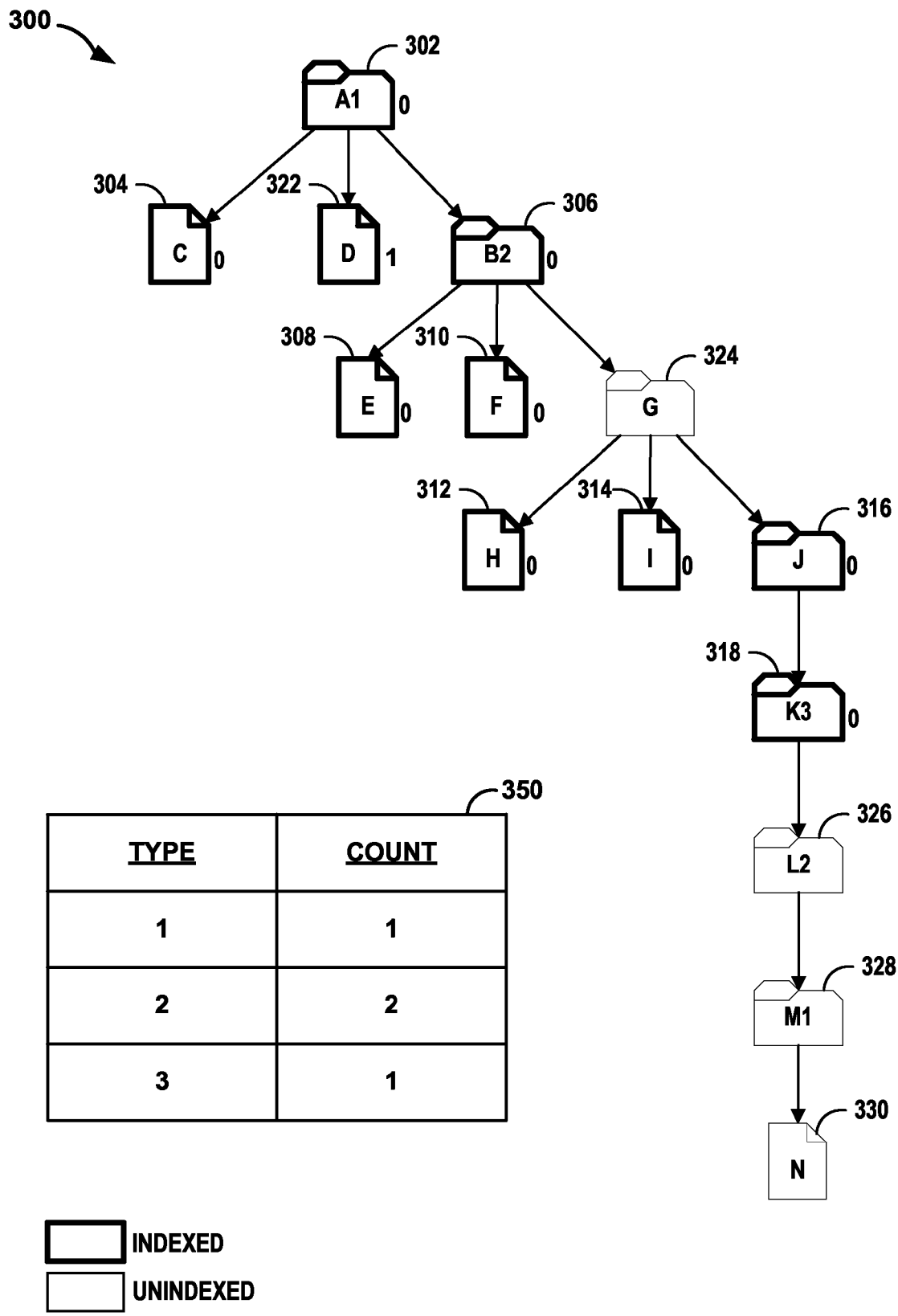

In one example, for the folder tree 300 shown in FIG. 3A, indexer 106 may first query for children of instances of folder type 1 that (1) qualify for file path indexes, (2) do not have file path indexes, and (3) have a parent folder that is associated with a file path index, and may associate the child items returned by the query with file path indexes. As shown in FIG. 3B, file D 322 has been associated with a file path index as a result, and the count associated with folder type 1 in map 250 has been decremented from 2 to 1.

Figure 3C:
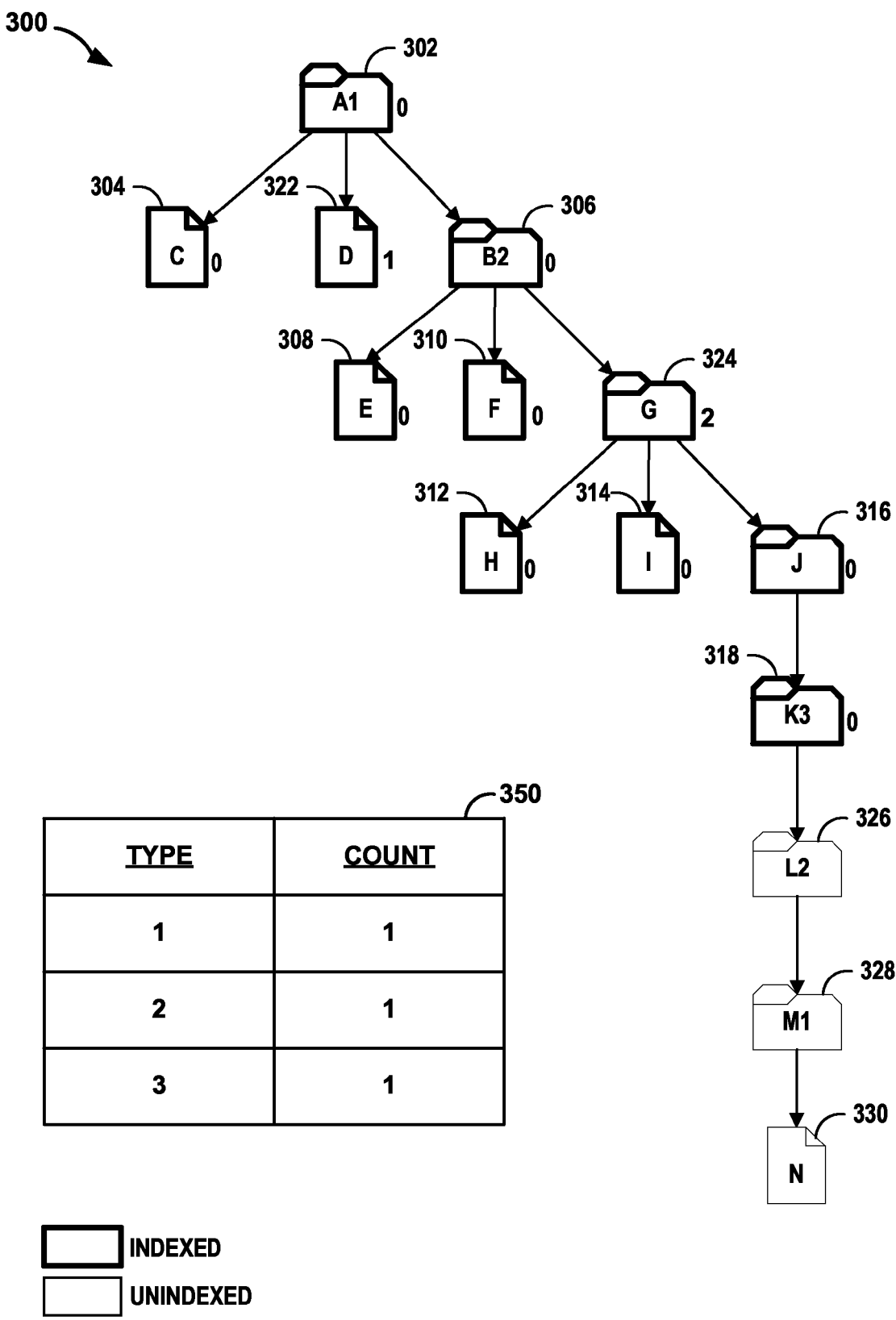

In one example, after querying for instances of folder type 1, indexer 106 may query for children of instances of folder type 2 that (1) qualify for file path indexes, (2) do not have file path indexes, and (3) have a parent folder that is associated with a file path index, and may associate the child items returned by the query with file path indexes. As shown in FIG. 3C, folder G 324 has been associated with a file path index as a result, and the count associated with folder type 2 in map 250 has been decremented from 2 to 1.

Figure 3D:
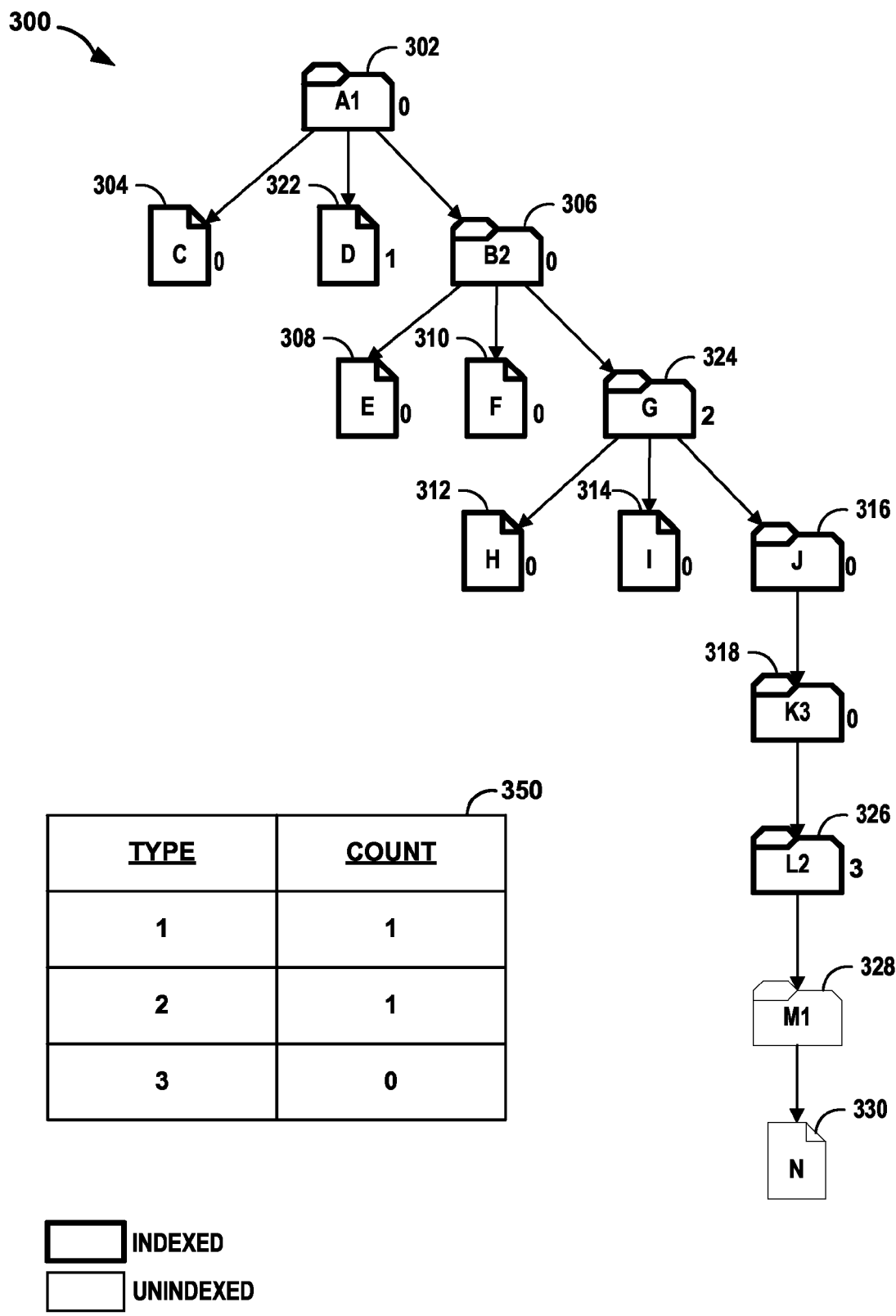

In one example, after querying for instances of folder type 2, indexer 106 may query for children of instances of folder type 3 that (1) qualify for file path indexes, (2) do not have file path indexes, and (3) have a parent folder that is associated with a file path index, and may associate the child items returned by the query with file path indexes. As shown in FIG. 3D, folder L2 326 has been associated with a file path index as a result, and the count associated with folder type 3 in map 250 has been decremented from 1 to 0. If the count associated with a folder type becomes 0, the folder type may be removed from consideration, so that indexer 106 will not continue to query for children of instances of that folder type. Thus, indexer 106 may no longer query for children of instances of folder type 3. In some examples, the folder type and its associated count may also be removed from map 350 if the count associated with the folder type becomes 0.

In one example, after querying for instances of folder type 3, indexer 106 may re-query for children of instances of folder type 1 that (1) qualify for file path indexes, (2) do not have file path indexes, and (3) have a parent folder that is associated with a file path index, and may associate the child items returned by the query with file path indexes. Because the remaining instance of folder type 1 is folder M1 328, which itself is not associated with a file path index, the query will not return any children of instances of item type 1.

In some examples, indexer 106 tracks the number of resulting instances returned by the query above to determine whether all of the children of folders in indexable content 112 of content repository 102 that are missing file path indexes are now associated with file path indexes by tracking the number of resulting instances returned by the query above. If the current query returns zero instances and if the query previous to the current query returned one or more instances, indexer 106 may mark the folder type associated with the current query, such as by setting a bit in map 350. If a subsequent query returns one or more instances, then indexer 106 may unmark the previously marked folder type. However, if indexer 106 loops through the folder types in map 350 and reaches an already marked folder type, then indexer 106 may determine that all of the children of folders in indexable content 112 of content repository 102 that are missing file path indexes are now associated with file path indexes, and the process may terminate. Thus, because the query for instances of folder type 1 did not return any items, and because the query for instances of folder type 3 immediately previous to the query for instances of folder type 1 did return at least one instance, indexer 106 may mark folder type 1.

Figure 3E:
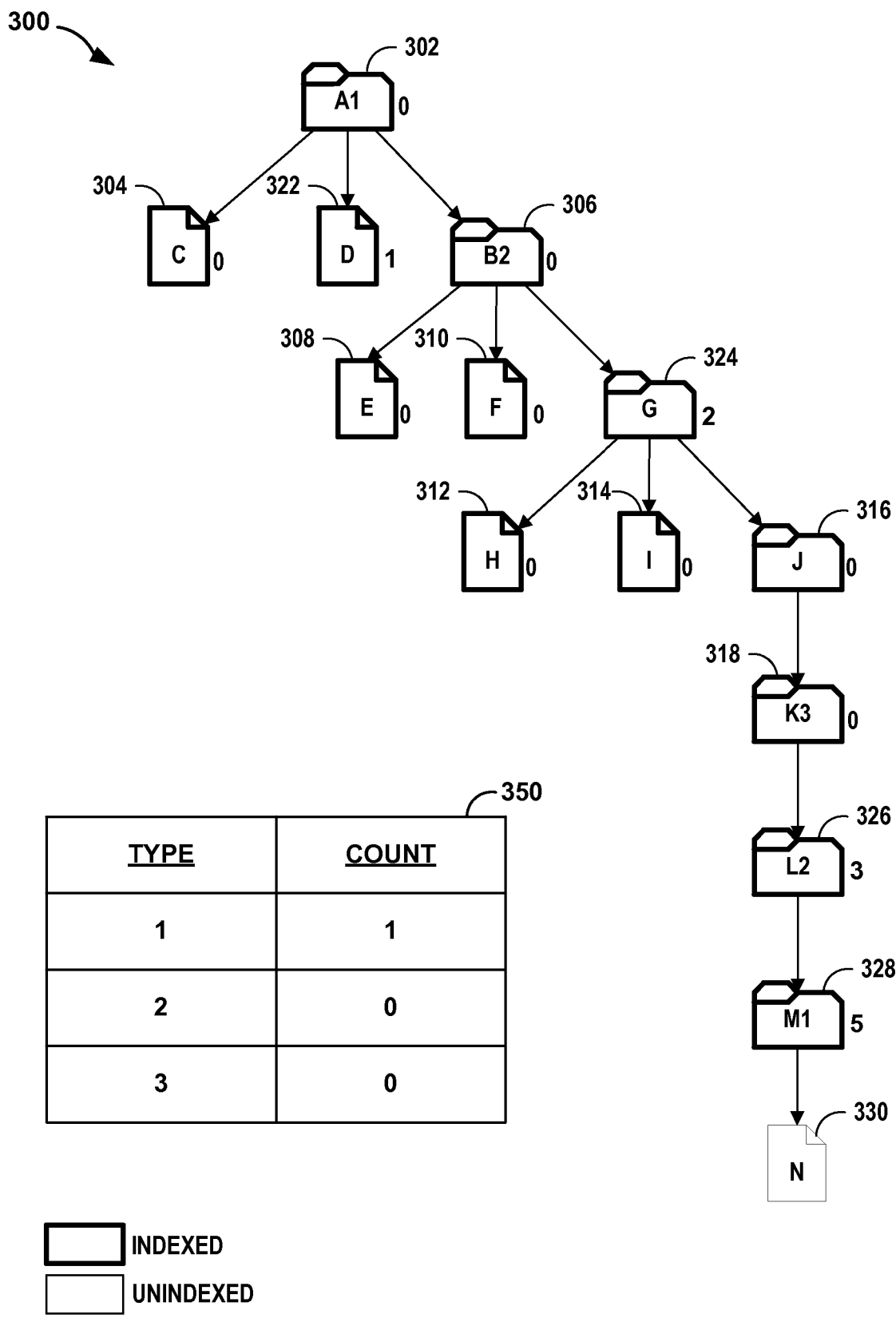

In one example, after querying for children of instances of folder type 1, indexer 106 may re-query for children of instances of folder type 2 that (1) qualify for file path indexes, (2) do not have file path indexes, and (3) have a parent folder that is associated with a file path index, and may associate the child items returned by the query with file path indexes. As shown in FIG. 3E, folder M1 328, which is a child item of folder L2 326, has been associated with a file path index as a result, and the count associated with folder type 2 in map 350 has been decremented from 1 to 0. Because the query for folder type 2 returned at least one instance, folder type 1 may be unmarked.

Figure 3F:
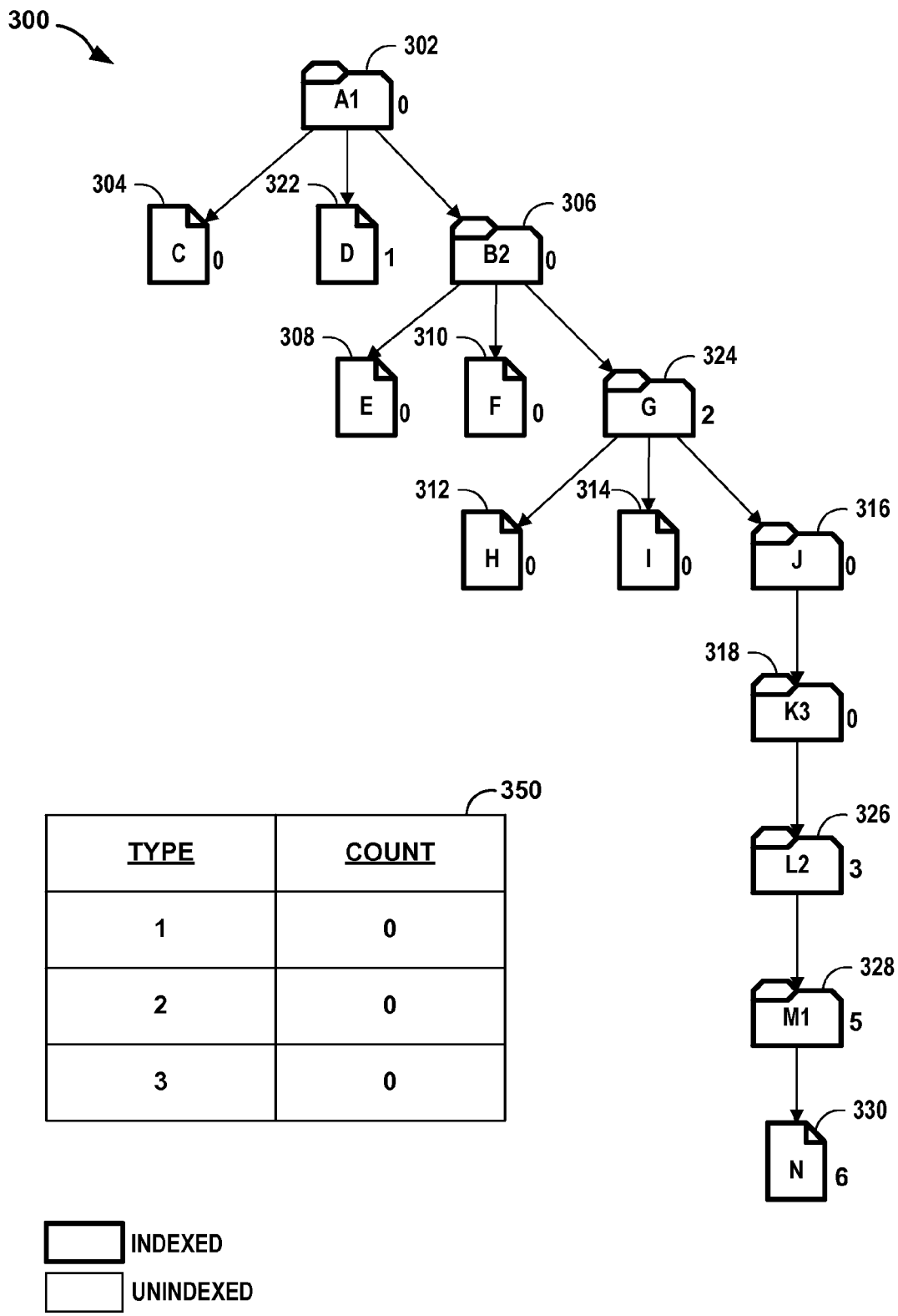

Because folder type 3 is associated with a count of 0 in map 350, folder type 3 may be marked in map 350 and, instead of querying for children of instances of folder type 3 after querying for children of instances of folder type 2, indexer 106 may re-query for children of instances of folder type 1 that (1) qualify for file path indexes, (2) do not have file path indexes, and (3) have a parent folder that is associated with a file path index, and may associate the child items of the instances returned by the query with file path indexes. As shown in FIG. 3F, file N 330, which is a child item of folder M1 328, has been associated with a file path index as a result, and the count associated with folder type 3 in map 250 has been decremented from 1 to 0. Because the query for folder type 1 returned at least one instance, folder type 3 may be unmarked. If termination of the indexing process is based on determining if all of the folder types in map 250 are associated with zero counts, then the indexing process may terminate.

After querying for folder type 1, indexer 106 may query for instances of folder type 2. However, as discussed above, because folder type 2 is associated with a count of zero in map 350, folder type 2 may be skipped. Folder type 2 may also be marked because folder type 2 is skipped and because the immediately preceding query for instances of folder type 1 returned at least one instance. Because all three folder types in map 250 have an associated count of 0, queries for folder types 3 and 1 will also be skipped by indexer 106. In addition, when indexer once again reaches folder type 2, indexer 106 may end the query in response to determining that folder type 2 is marked and that a query for instances of folder type 2 would return zero instances. Thus, if termination of the indexing process is based on determining if the query has reached an already marked item, then indexer 106 may determine that all items missing file path indexes in indexable content 112 are now associated with file path indexes and may terminate the indexing process.

Figure 4:
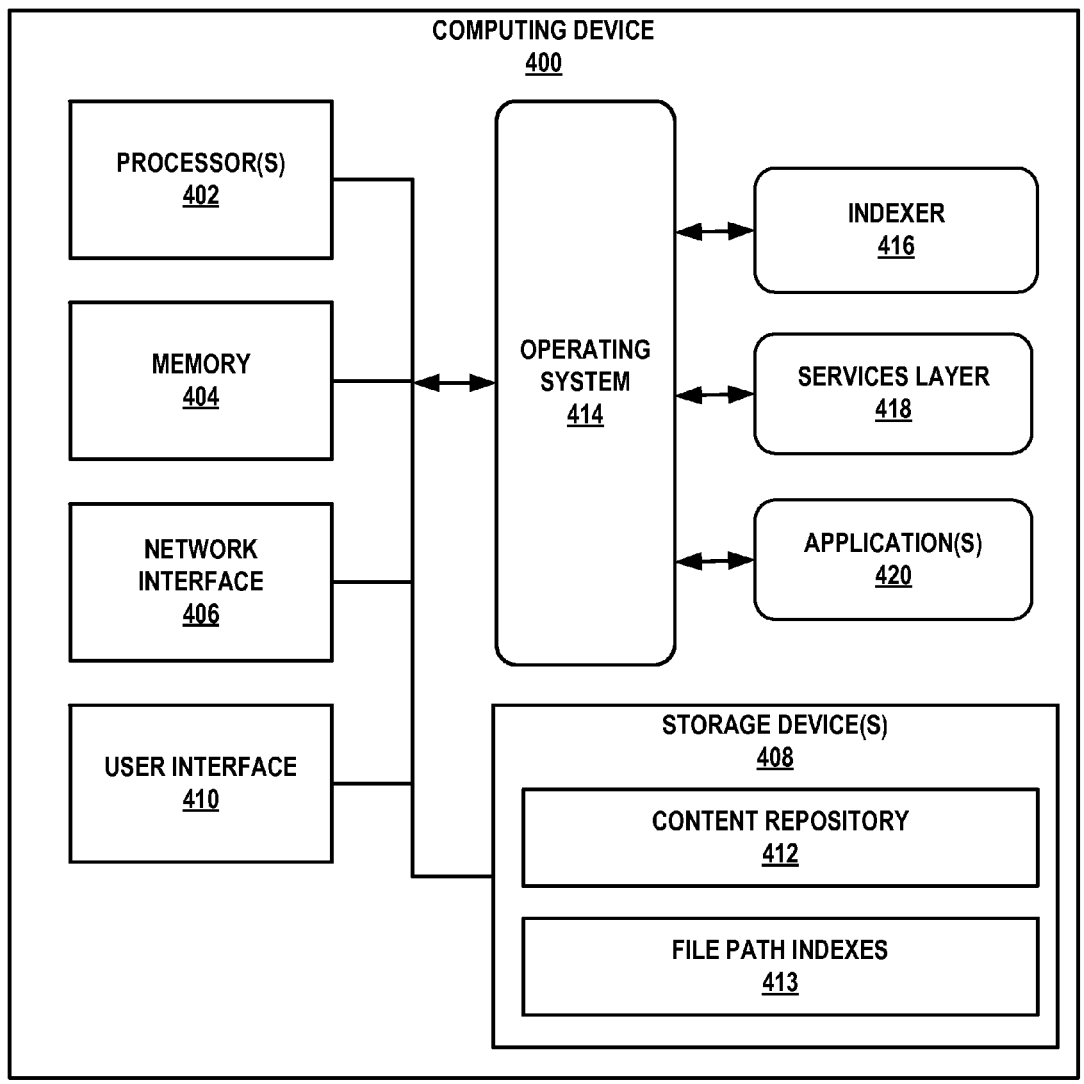
FIG. 4 is a block diagram illustrating an example computing device according to some aspects of the disclosure.

FIG. 4 is a block diagram illustrating an example computing device according to some aspects of the disclosure. As shown in FIG. 4, computing device 400 may be one of one or more computing devices that make up a computing system, such as computing system 100 shown in FIG. 1A.

Computing device 400 may include one or more processors 402, memory 404, a network interface 406, one or more storage devices 408, and user interface 410. Computing device 400 may also include an operating system 414, which may include modules and/or applications that are executable by processors 402 and computing device 400. Computing device 400, in one example, may also include indexer 416, services layer 418, and one or more applications 420, which all may be executable by one or more processors 402 of computing device 400. Each of components 402, 404, 406, 408, 410, 414, 416, 418, and 420 may be interconnected (physically, communicatively, and/or operatively) for inter-component communications.

Processors 402, in one example, may be configured to implement functionality and/or process instructions for execution within computing device 400. For example, processors 402 may be capable of processing instructions stored in memory 404, or instructions stored on storage devices 408. These instructions may define or otherwise control the operation of operating system 414, indexer 416, services layer 418, and one or more applications 420.

Memory 404 may, in one example, be configured to store information within computing device 400 during operation. Memory 404, in some examples, may be described as a computer readable storage medium. In some examples, memory 404 may be a temporary memory, meaning that a primary purpose of memory 404 is not long-term storage. Memory 404 may, in some examples, be described as a volatile memory, meaning that memory 404 does not maintain stored contents when computing device 400 is turned off. Examples of volatile memories may include random access memories (RAM), dynamic random access memories (DRAM), static random access memories (SRAM), and other forms of volatile memories known in the art. In some examples, memory 404 may be used to store program instructions for execution by processors 402. Memory 404 may, in one example, be used by software or applications running on computing device 400 (e.g., indexer 416) to temporarily store information during program execution.

Computing device 400 may, in some examples, also include network interface 406. Computing device 400 may, in one example, use network interface 406 to communicate with external devices via one or more networks. Network interface 406 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, computing device 400 may use network interface 406 to wirelessly communicate with an external device such as a server, mobile phone, or other networked computing device.

Storage devices 408 may, in some examples, also include one or more computer readable storage media. Storage devices 408 may be configured to store larger amounts of information than memory 404. Storage devices 408 may further be configured for long-term storage of information. In some examples, storage devices 408 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In some examples, storage devices 408 may include content repository 412, such as content repository 102 shown in FIG. 1A, and file path indexes 413, such as file path indexes 105 shown in FIG. 1A. Content repository 412 may include one or more data stores for storing digital content. In some examples, content repository 412 may not natively support file paths or folder trees. For example, content repository 412 may be a queryable repository, such as a relational database. In some examples, content repository 412 may be an enterprise repository. Content repository 412, in some examples, may include indexable content and non-indexable content. Indexable content may include data that may be represented as folder trees by services layer 418. Non-indexable content may include data that are not represented as folder trees by services layer 418. In some examples, file path indexes 413 may include a file path index indicating the file path for each file in a folder tree in indexable content of content repository 412, so that services layer 418 may, for example, enable one or more applications 420 to specify an item in content repository 102 by a file path that uniquely identifies the item in a folder tree. In some examples, file path indexes may be stored in content repository 412 and may be considered non-indexable content.

Computing device 400 may, in some examples, also include one or more user interfaces 410. User interface 410 may be configured to receive input from a user (e.g., tactile, audio, or video feedback). User interface 410 may include a touch-sensitive and/or a presence-sensitive screen, mouse, a keyboard, a voice responsive system, or any other type of device for detecting a command from a user. In some examples, user interface 410 may include a touch-sensitive screen, mouse, keyboard, microphone, or camera.

User interface 410 may also include, combined or separate from input devices, output devices. In this manner, user interface 410 may be configured to provide output to a user using tactile, audio, or video stimuli. In one example, user interface 410 may include a touch-sensitive screen, sound card, a video graphics adapter card, or any other type of device for converting a signal into an appropriate form understandable to humans or machines. In addition, user interface 410 may include a speaker, a cathode ray tube (CRT) monitor, a liquid crystal display (LCD), or any other type of device that can generate intelligible output to a user.

Computing device 400 may, in some examples, also include operating system 414. Operating system 414 may, in some examples, control the operation of components of computing device 400. For example, operating system 414 may, in one example, facilitate the interaction of indexer 416 with services layer 418, applications 420, processors 402, memory 404, network interface 406, storage device 408, and user interface 410.

Computing device 400 may, in some examples, further include indexer 416, which may be similar to indexer 106 shown in FIG. 1A. Indexer 416 may be an executable software application running on one or more processors 402 and stored in memory 404 or one or more storage devices 408. In some examples, indexer 416 may be configured to determine items in a content repository, such as content repository 102, that are not associated with file path indexes, and to associate those items with file path indexes.

Indexer 406 may be configured to associate each item type having one or more instances that are not associated with file path indexes and that are filed in one or more folders in a content repository out of a plurality of item types with a count of the one or more instances. Indexer 406 may be further configured to, for each item type associated with the count of the one or more instances in turn in a round robin sequence until the count of the one or more instances reaches zero for each item type, query the content repository for instances of the item type associated with the count of the one or more instances that are not associated with one or more file path indexes and that are filed in a folder that is associated with a file path index, responsive to the query returning one or more instances of the item type, associate the one or more instances of the item type with the one or more file path indexes, and adjust the count of the one or more instances associated with the item type based on the associating the one or more instances of the item type with the one or more file path indexes.

Alternatively, indexer 406 may be configured to associate each folder type having one or more instances that have one or more child items that are not associated with file path indexes in a content repository out of a plurality of folder types with a count of the one or more instances. Indexer 406 may be further configured to, for each folder type associated with the count of the one or more instances in turn in a round robin sequence until the count of the one or more instances reaches zero for each folder type, query the content repository for child items of instances of the folder type associated with the count of the one or more instances that are not associated with one or more file path indexes, responsive to the query returning one or more child items of instances of the folder type, associate the one or more child items of instances of the folder type with the one or more file path indexes, and adjust the count of the one or more instances associated with the folder type based on the associating the one or more child items of instances of the folder type with the one or more file path indexes.

Computing device 400 may, in some examples, further include services layer 418, which may be similar to services layer 104 shown in FIG. 1A. Services layer 418 may be an executable software application running on one or more processors 402 and stored in memory 404 or one or more storage devices 408. In some examples, services layer 418 may be configured to provide services and interfaces to applications, such as one or more applications 420, for accessing data stored in content repository 412. In some examples, the services and interfaces provided by services layer 418 may include an application programming interface (API) that applications may use to access data stored in content repository 412. In some other examples, services layer 418 may provide web services that applications may use to access data stored in content repository 412 over the web.

In some examples, services layer 418 may also be configured to abstract items in content repository 412 so that they may appear as one or more folder trees to one or more applications. For example, services layer 418 may be configured to maintain file path indexes 413 that includes a file path index indicating the file path for files in a folder tree in content repository 412. The services and interfaces provided by services layer 418 may, for example, enable one or more applications to specify an item in content repository 412 by a file path that uniquely identifies the item in a folder tree.

Computing device 400 may, in some examples, further include one or more applications 420, such as one or more applications 108 and one or more applications 110 shown in FIG. 1A. One or more applications 420 may be an executable software application running on one or more processors 402 and stored in memory 404 or one or more storage devices 408. In some examples, one or more applications 420 may be configured to access items in content repository 412 via services layer 418. In some examples, one or more applications 420 may be configured to directly access items in content repository 412 without using services layer 418.

Any applications (e.g., indexer 416) implemented within or executed by computing device 400 may be implemented or contained within, operable by, executed by, and/or be operatively/communicatively coupled to components of computing device 400 (e.g., processors 402, memory 404, network interface 406, storage devices 408, and user interface 410).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various embodiments of the invention have been described. These and other embodiments are within the scope of the following claims.

The invention claimed is:

1. A method for associating, by at least one processor, file path indexes with items in a content repository, comprising:
for each item type having one or more instances that are not associated with file path indexes and that are filed in one or more folders in a content repository out of a plurality of item types in turn in a round robin sequence,
querying, by the at least one processor, the content repository for instances of the item type that are not associated with one or more file path indexes and that are filed in a folder that is associated with a file path index, and
responsive to the querying returning, by the at least one processor, one or more instances of the item type, associating the one or more instances of the item type with the one or more file path indexes.

2. The method of claim 1, wherein the querying further comprises:
marking the item type if the querying returns zero instances of the item type and if no other item type is marked.

3. The method of claim 2, further comprising:
ceasing the querying and the associating if the item type is already marked.

4. The method of claim 2, further comprising:
unmarking the item type if subsequently querying another item type returns one or more instances of the another item type.

5. The method of claim 1, further comprising:
associating each item type having one or more instances that are not associated with file path indexes and that are filed in one or more folders in a content repository out of a plurality of item types with a count of the one or more instances.

6. The method of claim 5, wherein the associating further comprises:
storing, in a map, associations between each item type having one or more instances that are not associated with file path indexes and that are filed in one or more folders and the count of the one or more instances.

7. The method of claim 5, further comprising:
removing one or more item types that are not subject to file path indexing from the plurality of item types.

8. A computing system comprising:
one or more processors; and
an indexer operable on the one or more processors and configured to:
for each item type having one or more instances that are not associated with file path indexes and that are filed in one or more folders in a content repository out of a plurality of item types in turn in a round robin sequence,
query the content repository for instances of the item type that are not associated with one or more file path indexes and that are filed in a folder that is associated with a file path index, and
responsive to the query returning one or more instances of the item type, associate the one or more instances of the item type with the one or more file path indexes.

9. The computing system of claim 8, wherein query the content repository further comprises:
mark the item type if the querying returns zero instances of the item type and if no other item type is marked.

10. The computing system of claim 9, wherein the indexer is further configured to:
cease to query, associate, and adjust if the item type is already marked.

11. The computing of claim 9, wherein the indexer is further configured to:
unmark the item type if a subsequently query of another item type returns one or more instances of the another item type.

12. The computing system of claim 8, wherein the indexer is further configured to:
associate each item type having one or more instances that are not associated with file path indexes and that are filed in one or more folders in a content repository out of a plurality of item types with a count of the one or more instances.

13. The computing system of claim 12, wherein associate the one or more instances of the item type further comprises:
store, in a map, associations between each item type having one or more instances that are not associated with file path indexes and that are filed in one or more folders and the count of the one or more instances.

14. The computing system of claim 12, wherein the indexer is further configured to:
remove one or more item types that are not subject to file path indexing from the plurality of item types.

15. A computer readable storage medium containing instructions that, when executed on at least one programmable processor, cause the at least one programmable processor to perform operations comprising:
for each item type having one or more instances that are not associated with file path indexes and that are filed in one or more folders in a content repository out of a plurality of item types in turn in a round robin sequence,
querying the content repository for instances of the item type that are not associated with one or more file path indexes and that are filed in a folder that is associated with a file path index, and
responsive to the querying returning one or more instances of the item type, associating the one or more instances of the item type with the one or more file path indexes.

16. The computer readable storage medium of claim 15, wherein the querying further comprises:
marking the item type if the querying returns zero instances of the item type and if no other item type is marked.

17. The computer readable storage medium of claim 16, wherein the operations further comprises:
ceasing the querying, the associating, and the adjusting if the item type is already marked.

18. The computer readable storage medium of claim 16, wherein the operations further comprises:
unmarking the item type if subsequently querying another item type returns one or more instances of the another item type.

19. The computer readable storage medium of claim 15, further comprising:
associating each item type having one or more instances that are not associated with file path indexes and that are filed in one or more folders in a content repository out of a plurality of item types with a count of the one or more instances.

20. The computer readable storage medium of claim 19, wherein the associating further comprises:
storing, in a map, associations between each item type having one or more instances that are not associated with file path indexes and that are filed in one or more folders and the count of the one or more instances.

21. The computer readable storage medium of claim 19, wherein the operations further comprises:
removing one or more item types that are not subject to file path indexing from the plurality of item types.

22. A method for associating, by at least one processor, file path indexes with items in a content repository, comprising:
for each folder type having one or more instances that have one or more child items that are not associated with file path indexes in a content repository out of a plurality of folder types in turn in a round robin sequence,
querying, by the at least one processor, the content repository for child items of instances of the folder type that are not associated with one or more file path indexes, and
responsive to the querying returning, by the at least one processor, one or more child items of instances of the folder type, associating the one or more child items of instances of the folder type with the one or more file path indexes.

23. The method of claim 22, wherein the querying further comprises:
marking the folder type if the querying returns zero child items of instances of the folder type and if no other folder type is marked.

24. The method of claim 23, further comprising:
ceasing the querying, the associating, and the adjusting if the querying returns zero child items of instances of the folder type and if the folder type is already marked.

25. The method of claim 23, further comprising:
unmarking the folder type if subsequently querying another folder type returns one or more child items of instances of the another folder type.

\* \* \* \* \*